United States Patent
Schoinas et al.

(10) Patent No.: US 7,334,107 B2
(45) Date of Patent: Feb. 19, 2008

(54) CACHING SUPPORT FOR DIRECT MEMORY ACCESS ADDRESS TRANSLATION

(75) Inventors: Ioannis Schoinas, Portland, OR (US); Rajesh Madukkarumukumana, Portland, OR (US); Gilbert Neiger, Portland, OR (US); Richard Uhlig, Hillsboro, OR (US); Balaji Vembu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 464 days.

(21) Appl. No.: 10/956,206

(22) Filed: Sep. 30, 2004

(65) Prior Publication Data
US 2006/0075147 A1   Apr. 6, 2006

(51) Int. Cl.
*G06F 12/00*   (2006.01)
*G06F 13/28*   (2006.01)

(52) U.S. Cl. .................. 711/207; 711/118; 711/154

(58) Field of Classification Search ............ 711/100, 711/118, 141, 154, 200, 202, 133, 207; 710/3, 710/22
See application file for complete search history.

(56) References Cited

U.S. PATENT DOCUMENTS

| | | | |
|---|---|---|---|
| 5,809,528 A * | 9/1998 | Miller et al. ............ | 711/136 |
| 5,914,730 A * | 6/1999 | Santos et al. ............ | 345/531 |
| 6,338,128 B1 * | 1/2002 | Chang et al. ............ | 711/203 |
| 7,155,576 B1 * | 12/2006 | Garner et al. ............ | 711/137 |

FOREIGN PATENT DOCUMENTS

EP   0674269 A2   9/1995

* cited by examiner

*Primary Examiner*—Tuan V. Thai
(74) *Attorney, Agent, or Firm*—Philip A. Pedigo

(57) ABSTRACT

An embodiment of the present invention is a technique to provide cache support for direct memory access address translation. A cache structure stores cached entries used in address translation of a guest physical address to a host physical address. The guest physical address corresponds to a guest domain identified by a guest domain identifier in an input/output (I/O) transaction requested by an I/O device. A register stores an invalidating domain identifier identifying an invalidating domain and an indicator indicating invalidating an entry in the cached entries having a tag.

48 Claims, 14 Drawing Sheets

CONTEXT COMMAND REGISTER (CCMD_REG) 1010

| SID | DID | AIG | IRG | ICC |
|---|---|---|---|---|
| 1019 | 1018 | 1016 | 1014 | 1012 |

I/O TLB INVALIDATE REGISTER (IOTLB_REG) 1020

| DID | AIG | IRG | IVT |
|---|---|---|---|
| 1028 | 1026 | 1024 | 1022 |

INVALIDATE ADDRESS REGISTER (IVA_REG) 1030

| GPA |
|---|
| 1032 |

CACHING SUPPORT FOR DIRECT MEMORY ACCESS ADDRESS TRANSLATION

BACKGROUND

1. Field of Invention

Embodiments of the invention relate to the field of microprocessors, and more specifically, to input/output (I/O) virtualization.

2. Description of Related Art

As microprocessor architecture becomes more and more complex to support high performance applications, I/O management presents a challenge.

Existing techniques to address the problem of I/O management have a number of disadvantages. One technique uses software-only I/O virtuailization to support virtual machine (VM) I/O. This technique has limited functionality, performance, and robustness. The functionality seen by the guest operating system (0/S) and applications is limited by the functionality supported by the virtual devices emulated in the VM monitor (VMM) software. The guest I/O operations are trapped by the VMM and proxied or emulated before being submitted to the underlying physical-device hardware, resulting in poor performance. In addition, all or parts of the device driver for the hardware device are run as part of the privileged VMM software, which may adversely affect overall robusmess of the platform. Techniques using specialized translation structures can only support a specific device or a limited usage model. General I/O memory management units provide only support for I/O virtual address spaces of limited size or complexity.

BRIEF DESCRIPTION OF THE DRAWINGS

The embodiments of invention may best be understood by referring to the following description and accompanying drawings that are used to illustrate embodiments of the invention. In the drawings:

FIG. 10 is a diagram illustrating a register set containing cache control registers according to one embodiment of the invention.

DESCRIPTION

An embodiment of the present invention is a technique to provide cache support for direct memory access address translation. A cache structure stores cached entries used in address translation of a guest physical address to a host physical address. The guest physical address corresponds to a guest domain identified by a guest domain identifier in an input/output (I/O) transaction requested by an I/O device. A register stores an invalidating domain identifier identifying an invalidating domain and an indicator indicating invalidating an entry in the cached entries having a tag In the following description, numerous specific details are set forth. However, it is understood that embodiments of the invention may be practiced without these specific details. In other instances, well-known circuits, structures, and techniques have not been shown to avoid obscuring the understanding of this description.

Figure 1:
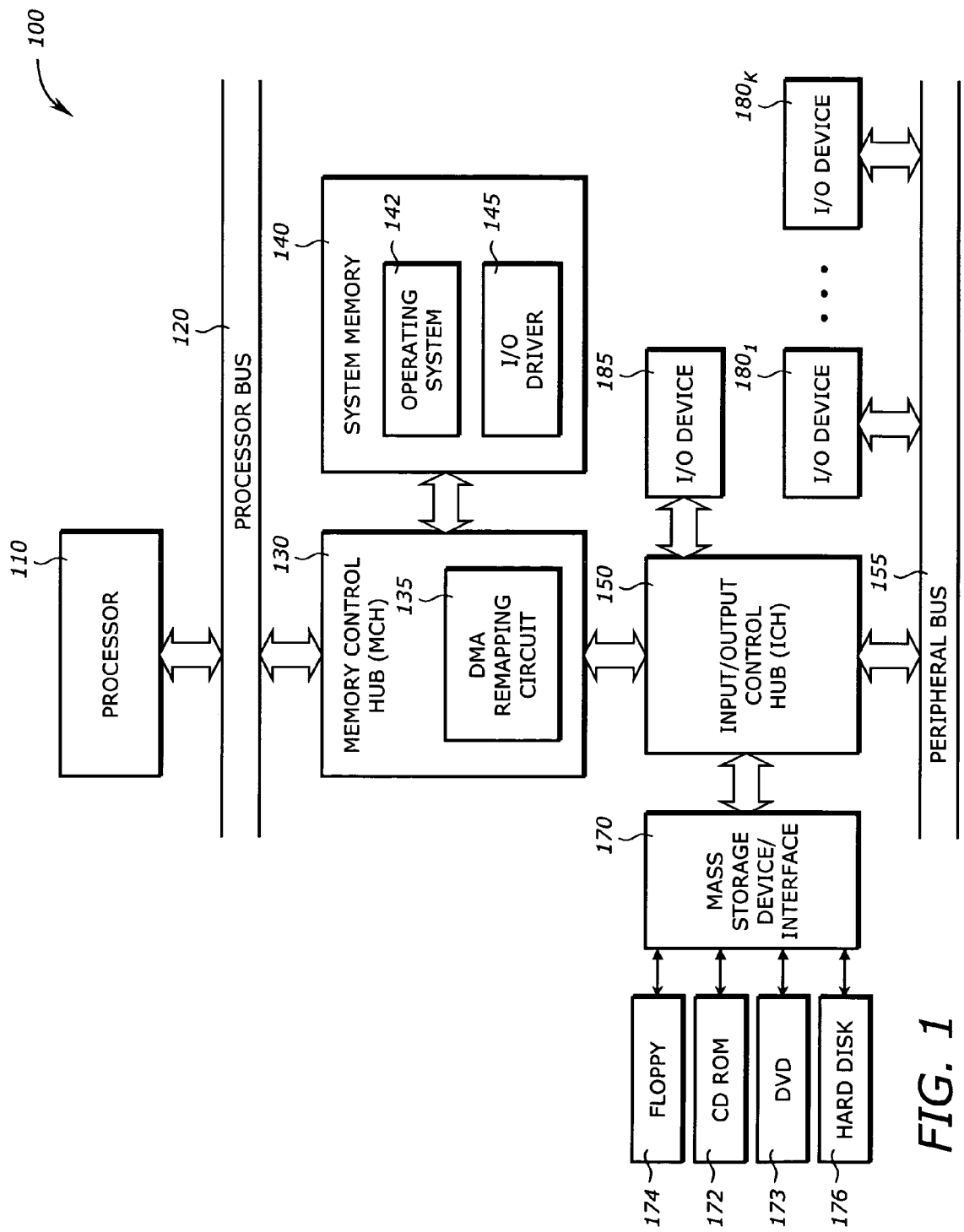
FIG. 1 is a diagram illustrating a system in which one embodiment of the invention can be practiced.

FIG. 1 is a diagram illustrating a system 100 in which one embodiment of the invention can be practiced. The system 100 includes a processor 110, a processor bus 120, a memory control hub (MCH) 130, a system memory 140, an input/output control hub (ICH) 150, a peripheral bus 155, a mass storage device/interface 170, and input/output devices $180_1$ to $180_K$, and 185. Note that the system 100 may include more or less elements than the above.

The processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The processor bus 120 provides interface signals to allow the processor 110 to communicate with other processors or devices, e.g., the MCH 130. The processor bus 120 may support a uni-processor or multiprocessor configuration. The processor bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. The MCH 130 interfaces to the peripheral bus 155 directly or via the ICH 150. For clarity, not all the peripheral buses are shown. It is contemplated that the system 100 may also include peripheral buses such as Peripheral Component Interconnect (PCI), PCI Express, accelerated graphics port (AGP), Industry Standard Architecture (ISA) bus, and Universal Serial Bus (USB), etc.

The MCH 130 includes a direct memory access (DMA) remapping circuit 135. The DMA remapping circuit 135 maps an I/O device (e.g., one of the I/O device 180$_1$ to 180$_K$ and 185) into a domain in the system memory 140 in an I/O transaction. The I/O transaction is typically a DMA request. The DMA remapping circuit 135 provides hardware support to facilitate or enhance I/O device assignment and/or management. The DMA remapping circuit 135 may also be included in any chipset other than the MCH 130, such as the ICH 150. It may also be implemented, partly or wholly, in the processor 110, or as a separate processor or co-processor to other processors or devices.

The system memory 140 stores system code and data. The system memory 140 is typically implemented with dynamic random access memory (DRAM) or static random access memory (SRAM). The system memory may include program code or code segments implementing one embodiment of the invention. The system memory includes an operating system (OS) 142, or a portion of the OS, or a kernel, and an I/O driver 145. Any one of the elements of the OS 142 or the I/O driver 145 may be implemented by hardware, software, firmware, microcode, or any combination thereof. The system memory 140 may also include other programs or data which are not shown.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus 155, processor interface, interrupt controller, direct memory access (DMA) controller, power management logic, timer, system management bus (SMBus), universal serial bus (USB) interface, mass storage interface, low pin count (LPC) interface, etc.

The mass storage device/interface 170 provides storage of archive information such as code, programs, files, data, applications, and operating systems. The mass storage device/interface 170 may interface to a compact disk (CD) ROM 172, a digital video/versatile disc (DVD) 173, a floppy drive 174, and a hard drive 176, and any other magnetic or optic storage devices. The mass storage device/interface 170 provides a mechanism to read machine-accessible media. The machine-accessible media may contain computer readable program code to perform tasks as described in the following.

The I/O devices 180$_1$ to 180$_K$ may include any I/O devices to perform I/O functions including DMA requests. They are interfaced to the peripheral bus 155. Examples of I/O devices 180$_1$ to 180$_K$ include controller for input devices (e.g., keyboard, mouse, trackball, pointing device), media card (e.g., audio, video, graphics), network card, and any other peripheral controllers. The I/O device 185 is interfaced directly to the ICH 150. The peripheral bus 155 is any bus that supports I/O transactions. Examples of the peripheral bus 155 include the PCI bus, PCI Express, etc.

Elements of one embodiment of the invention may be implemented by hardware, firmware, software or any combination thereof. The term hardware generally refers to an element having a physical structure such as electronic, electromagnetic, optical, electro-optical, mechanical, electromechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g, flash memory, read only memory, erasable read only memory). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

In a standard computing platform, the I/O subsystem components function as part of a single domain and are managed by the operating-system software. One embodiment of the invention provides the hardware support required to assign I/O devices in a computing platform to multiple domains.

A domain is abstractly defined as an isolated environment in the platform, to which a sub-set of the host physical memory is allocated. The host physical memory is included in the system memory 140. I/O devices that are allowed to directly access the physical memory that is allocated to a domain are referred to as the domain's assigned devices. The isolation property of a domain is achieved by blocking access to its physical memory from resources not assigned to it. Multiple isolated domains are supported by ensuring all I/O devices are assigned to some domain (possibly a default domain), and by restricting access from each assigned device only to the physical memory allocated to its domain.

Each domain has a view of physical memory, or a physical address space, that may be different than the system view of physical memory. Addresses used by a domain's resources to access its physical address space is referred to as its guest physical address (GPA). The host physical address (HPA) refers to the system physical address used to access memory. A domain is considered relocated if its GPA is translated to a new HPA to access its allocated system physical memory. A domain is referred to as non-relocated if its guest physical address space is the same as, or a subset of, the system's host physical address space. The logical separation of GPA and HPA provides the basis for enforcing memory protection. It requires a physical-address translation and a protection mechanism that can validate guest physical addresses generated by a domain's assigned devices and translate it to valid host physical addresses. The DMA remapping circuit 135 provides this hardware support.

For assigning I/O devices to domains, physical-address translation and protection are applied for DMA requests from all I/O devices in the platform. For simplicity, the physical address translation functionality for I/O device DMA requests is referred to as DMA remapping.

Figure 2:
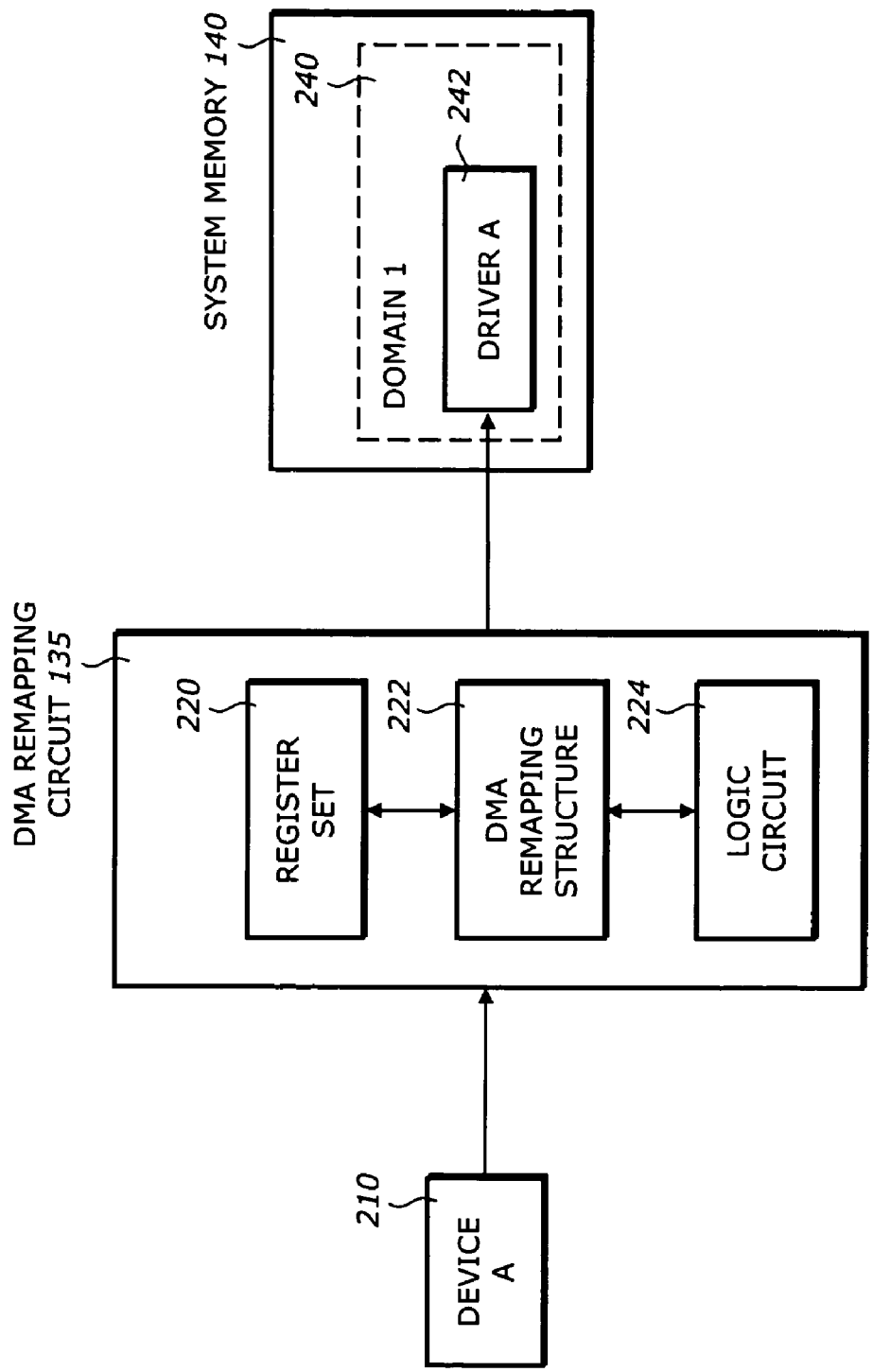
FIG. 2 is a diagram illustrating an input/output (I/O) device assignment according to one embodiment of the invention.

FIG. 2 is a diagram illustrating an input/output (I/O) device assignment according to one embodiment of the invention. The I/O device assignment is a mapping of an I/O device to a domain in the system memory 140. The mapping is supported by the DMA remapping circuit 135. As an example, device A 210 is mapped into domain 1 240 in the system memory 140. The domain 1 may have a driver 242 for the device A 210. More than one driver may also be used.

The DMA remapping circuit 135 includes a register set 220, a DMA remapping structure 222, and a logic circuit 224. The register set 220 includes a number of registers that provides control or status information used by the DMA remapping structure 222, the logic circuit 224, and the programs or drivers for the I/O devices. The DMA remapping structure 222 provides the basic structure, storage, or tables used in the remapping or address translation of the guest physical address to the host physical address in an appropriate domain. The logic circuit 224 includes circuitry that performs the remapping or address translation operations and other interfacing functions. The DMA remapping circuit 135 may have different implementations to support different configurations and to provide different capabilities for the remapping or address translation operations.

The I/O device assignment and/or management using the DMA remapping circuit 135 provides a number of usages or applications. Two useful applications are OS robustness applications and virtualization applications.

OS Robustness applications: Domain isolation has multiple uses for operating-system software. For example, an OS may define a domain containing its critical code and data structures in memory, and restrict access to this domain from all I/O devices in the system. This allows the OS to limit erroneous or unintended corruption of its data and code through incorrect programming of devices by device drivers, thereby improving its robustness.

In another usage, the OS may use domains to better manage DMA from legacy 32-bit PCI devices to high memory (above 4 GB). This is achieved by allocating 32-bit devices to one or more domains and programming the I/O-physical-address-translation mechanism to remap the DMA from these devices to high memory. Without such support, the software has to resort to data copying through OS bounce buffers.

In a more involved usage, an OS may manage I/O by creating multiple domains and assigning one or more I/O devices to the individual domains. In this usage, the device drivers explicitly register their I/O buffers with the OS, and the OS assigns these I/O buffers to specific domains, using hardware to enforce the DMA domain protections. In this model, the OS uses the I/O address translation and protection mechanism as an I/O memory management unit (I/O MMU).

Virtualization applications: The virtualization technology allows for the creation of one or more virtual machines (VMs) on a single system. Each VM may run simultaneously utilizing the underlying physical hardware resources. Virtual machines allow multiple operating system instances to run on the same processor offering benefits such as system consolidation, legacy migration, activity partitioning and security.

Virtualization architectures typically involve two principal classes of software components: (a) Virtual machine monitors (VMMs) and (b) Virtual Machines (VMs). The VMM software layer runs at the highest privilege level and has complete ownership of the underlying system hardware. The VMM allows the VMs to share the underlying hardware and yet provides isolation between VMs.

The limitations of software-only methods for I/O virtualization can be removed by direct assignment of I/O devices to VMs using the DMA remapping circuit 135. With direct assignment of devices, the driver for an assigned I/O device runs only in the VM to which it is assigned and is allowed to interact directly with the device hardware without trapping to the VMM. The hardware support enables DMA remapping without device specific knowledge in the VMM.

In this model, the VMM restricts itself to a controlling function where it explicitly does the set-up and tear-down of device assignment to VMs. Rather than trapping to the VMM for all guest I/O accesses as in the case of software-only methods for I/O virtualization, the VMM requires the guest I/O access trapping only to protect specific resources such as device configuration space accesses, interrupt management etc., that impact system functionality.

To support direct assignment of I/O devices to VMs, a VMM manages DMA from I/O devices. The VMM may map itself to a domain, and map each VM to an independent domain. The I/O devices can be assigned to domains, and the physical address translation hardware provided by the DMA remapping circuit 135 may be used to allow the DMA from I/O devices only to the physical memory assigned to its parent domain. For VMs that may be relocated in physical memory (i.e., the GPA not identical to the HPA), the DMA remapping circuit 135 can be programmed to do the necessary GPA-to-HPA translation.

With hardware support for I/O device assignment, VMM implementations can choose a combination of software-only I/O virtualization methods and direct device assignment for presenting I/O device resources to a VM.

Figure 3:
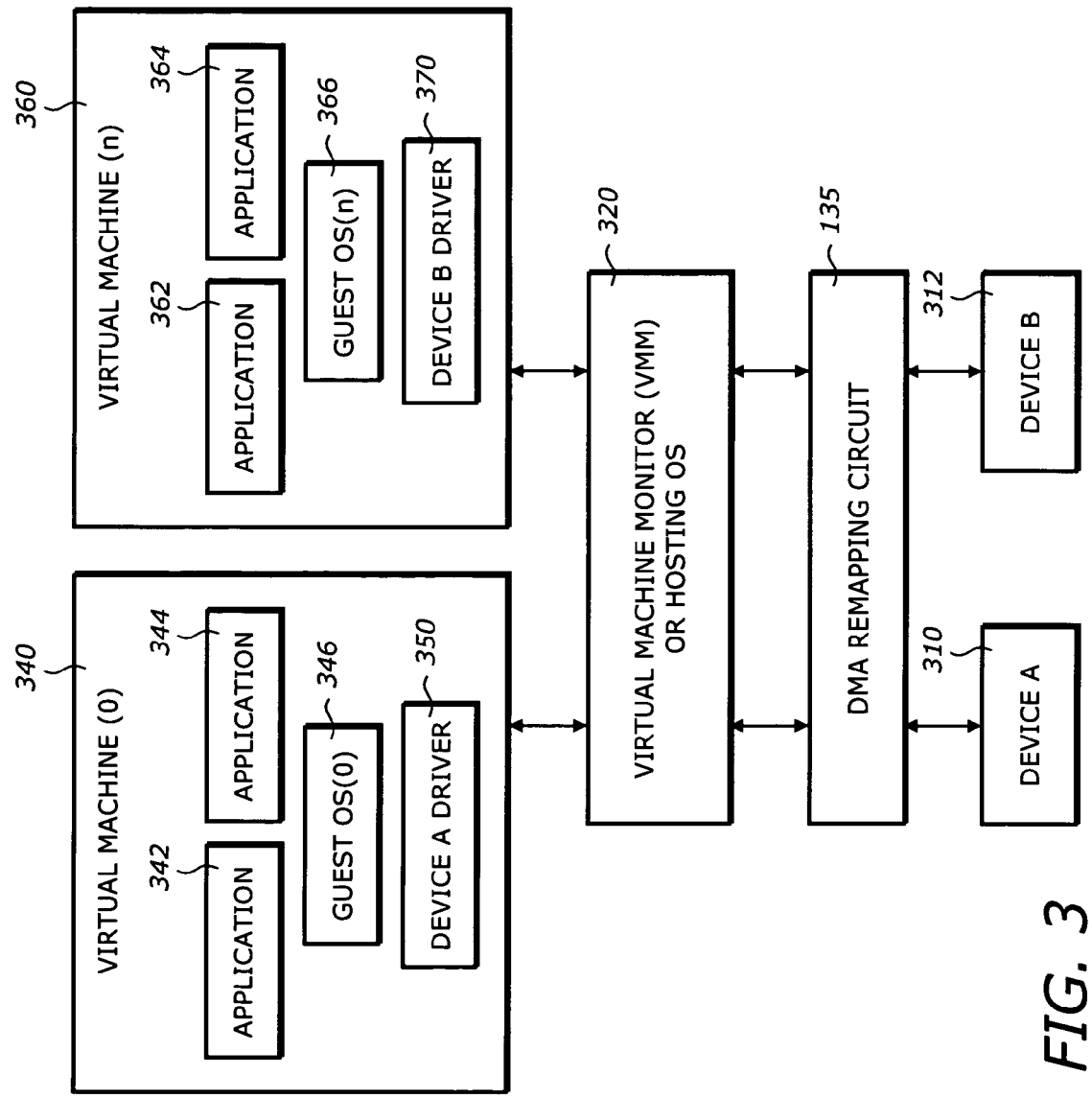
FIG. 3 is a diagram illustrating virtualization using direct memory access (DMA) remapping according to one embodiment of the invention.

FIG. 3 is a diagram illustrating virtualization using direct memory access (DMA) remapping according to one embodiment of the invention. The virtualization includes two devices A and B 310 and 312, the DMA remapping circuit 135, a VMM or hosting OS 320, $VM_0$ 340 and $VM_n$ 360.

The two devices A and B 310 and 312 are two I/O devices that are supported by the two VM 340 and 360, respectively. The DMA remapping circuit 135 directly maps these two devices to the respective VM's 340 and 360 without specific knowledge of the VMM or hosting OS 320.

The VMM or the hosting OS 320 provides support for the underlying hardware of the platform or the system it is running on. The VMs 340 and 360 have similar architectural components but are completely isolated from each other. They are interfaced to the VMM or hosting OS 320 to access to the system hardware. The VM 340 includes applications 342 and 344. More or less applications may be supported. It has a guest OS 346 and a device A driver 350. The device A driver 350 is a driver that drives, controls, interfaces, or supports the device A 310. Similarly, the VM 360 includes applications 362 and 364. More or less applications may be supported. It has a guest OS 366 and a device B driver 370. The guest OS 366 may be the same or different than the guest OS 346 in the VM 340. The device B driver 370 is a driver that drives, controls, interfaces, or supports the device B 312.

In the software-only method without the DMA remapping circuit 135, the device A and B drivers 350 and 370 would reside in the VMM or hosting OS 320. The functionality of these two drivers is therefore limited by the functionality emulated in the VMM. Without DMA remapping support, the VMM has to provide emulation/proxy drivers and the guest OS will use devices drivers specific to the virtual device that the VMM decides to expose. It could be a device unrelated to the real platform device or a device the same as the real platform device. In the latter case, the VMM proxies the real device. In addition, the performance may be limited because the guest I/O operations are trapped by the VMM or hosting OS 320 and proxied or emulated before being submitted to the underlying physical device hardware. Finally, since all or parts of the device A and B drivers 350 and 370 are run as part of the privileged VMM software, the overall robustness of the platform may be compromised, especially when these drivers may generate errors, crashing the VMM or hosting OS 320. With the DMA remapping circuit 135, the device A and B drivers 350 and 370 may interact directly to the respective I/O devices 310 and 312, and therefore avoid all of the above limitations.

The DMA remapping architecture provided by the DMA remapping circuit 135 facilitates the assigning of I/O devices to an arbitrary number of domains. Each domain has a physical address space that may be different than the system physical address space. The DMA remapping provides the transformation of guest physical address (GPA) in DMA requests from an I/O device to the corresponding host physical address (HPA) allocated to its domain.

To support this, the platform may support one or more I/O physical address translation hardware units. Each translation hardware unit supports remapping of the I/O transactions originating from within its hardware scope. For example, a desktop chipset implementation may expose a single DMA remapping hardware unit that translates all I/O transactions at the memory controller hub (MCH) component. A server platform with one ore more core chipset components may support independent translation hardware units in each component, each translating DMA requests originating within its I/O hierarchy. The architecture supports configurations where these hardware units may share the same translation data structures in system memory or use independent structures depending on software programming.

The chipset DMA remapping circuit 135 treats the address in a DMA requests as a guest physical address (GPA). The DMA remapping circuit 135 may apply the address translation function to the incoming address to convert it to a host physical address (HPA) before further hardware processing, such as snooping of processor caches or forwarding to the memory controller.

In a virtualization context, the address translation function implemented by the DMA remapping circuit 135 depends on the physical-memory management supported by the VMM. For example, in usages where the software does host physical memory allocations as contiguous regions, the DMA translation for converting GPA to HPA may be a simple offset addition. In usages where the VMM manages physical memory at page granularity, the DMA remapping circuit 135 may use a memory-resident address translation data structure.

Figure 4:
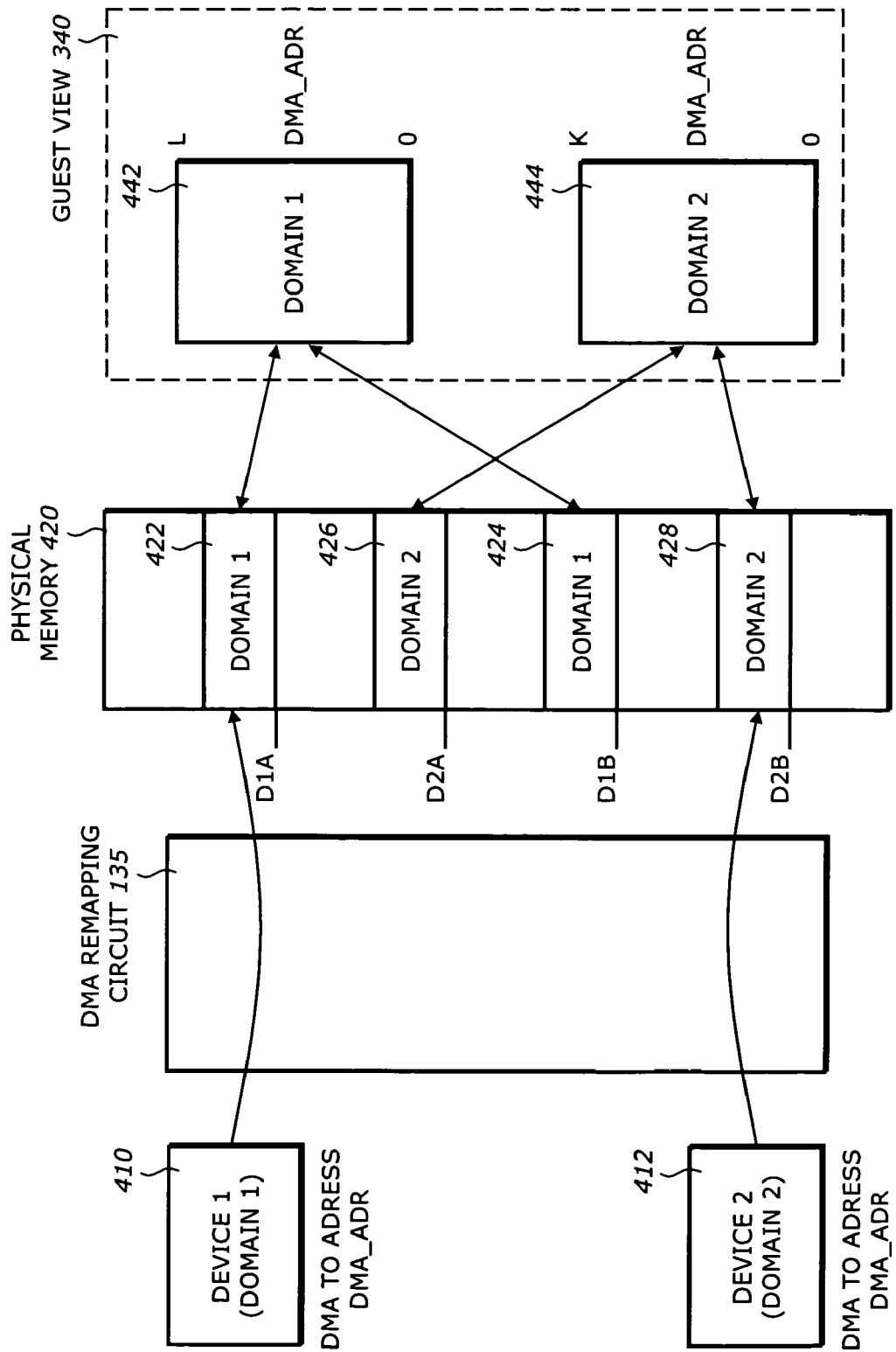
FIG. 4 is a diagram illustrating an I/O address translation according to one embodiment of the invention.

FIG. 4 is a diagram illustrating an I/O address translation according to one embodiment of the invention. The I/O address translation includes two I/O devices 1 and 2 410 and 412, the DMA remapping circuit 135, a physical memory 420, and a guest view 440.

The I/O devices 1 and 2 410 and 412 are assigned to two separate domains. They perform I/O requests or DMA requests to addresses DMA_ADR. The DMA remapping circuit 135 maps these two devices to corresponding domains allocated in the physical memory 420. The physical memory 420 allocates domains 1 422 and 424 and domains 2 426 and 428. More or less allocated memory sections may be allocated for these devices. The domains 1 422 and 424 correspond to device 1 410 and the domains 2 424 and 428 correspond to device 1 412. In the example illustrated in FIG. 4, device 1 410 is mapped to the domain 1 422 and the device 2 412 is mapped or assigned to the domain 2 428.

The guest view 440 is a logical view from the guest I/O devices. It includes domains 1 442 and 2 444. The domain 1 442 corresponds to the two domains 1 422 and 424 in the physical memory 420. The domain 2 444 corresponds to the two domains 2 426 and 428. From the guest view 440, there is only one domain corresponding to one I/O device. The DMA_ADR address from the device 1 410 is mapped to the DMA_ADR1 located within the address space from 0 to L of the domain 1 442. Similarly, the DMA_ADR address from the device 2 412 is mapped to the DMA_ADR2 located within the address space from 0 to K of the domain 2 444.

The software responsible for the creation and management of the domains allocates the physical memory 420 for both domains and sets up the GPA-to-HPA address translation function in the DMA remapping circuit 135. The DMA remapping circuit 135 translates the GPA generated by the devices 410 and 412 to the appropriate HPA's.

Figure 5:
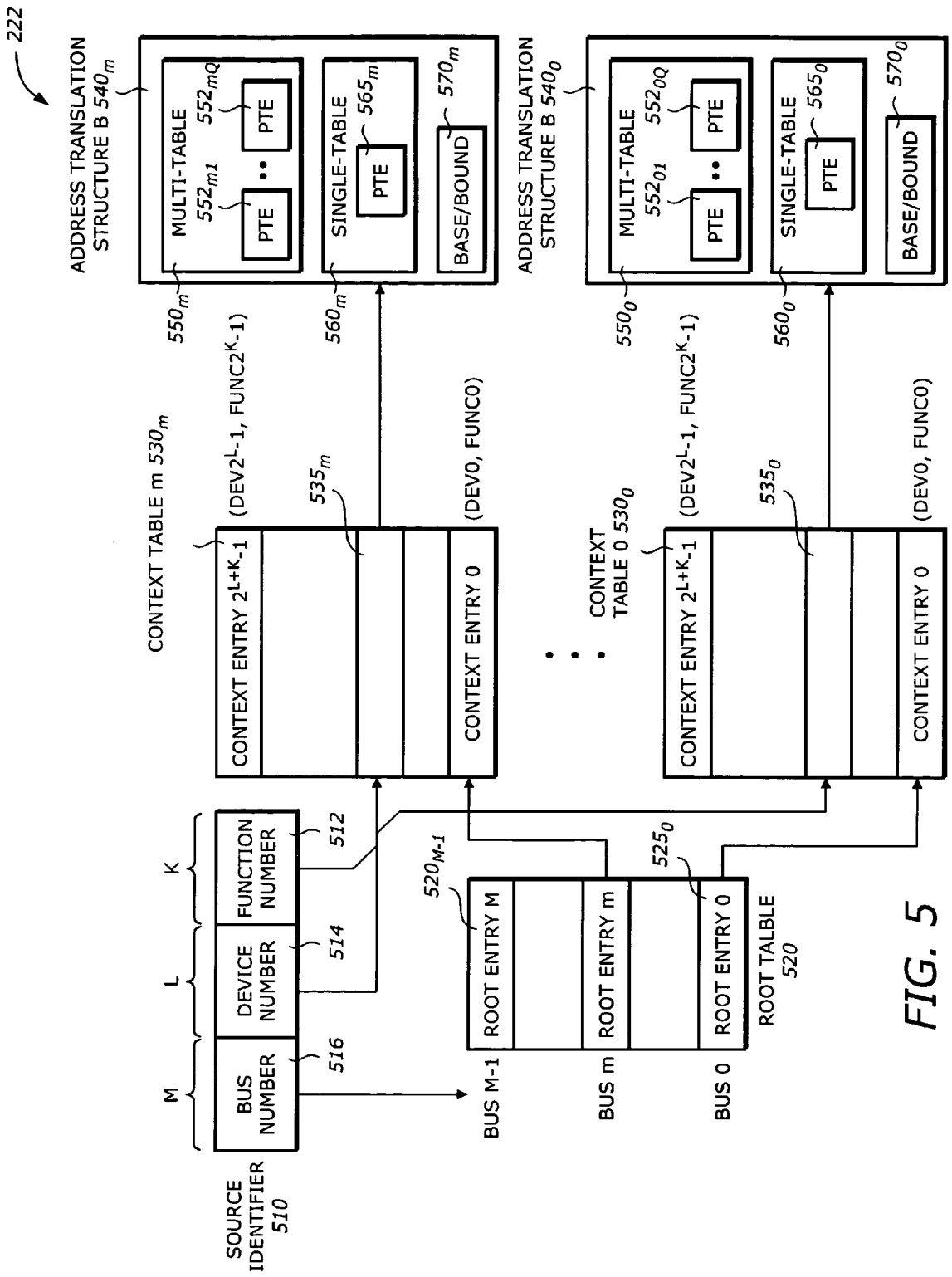
FIG. 5 is a diagram illustrating a DMA remapping structure according to one embodiment of the invention.

FIG. 5 is a diagram illustrating a DMA remapping structure 222 according to one embodiment of the invention. The DMA remapping structure 222 receives a source identifier 510 and includes a root table 520, a number of context tables $530_0$ to $530_U$, and a number of address translation structures $540_0$ to $540_V$. The remapping structure 222 receives the source identifier 510 and a guest physical address from the I/O device, and translates the guest physical device to a host physical device in an assigned domain. The translation may be performed using translation tables arranged in a hierarchical manner. The translation mechanism starts from the root table 520 and traverses, or walks, through the context tables $530_0$ to $530_U$, and the address translation structures $540_0$ to $540_V$.

The requestor identity of the I/O transactions appearing at the DMA remapping circuit 135 determines the originating device and the domain that the originating I/O device is assigned to. The source identifier 510 is the attribute identifying the originator of an I/O transaction. The DMA remapping circuit 135 may determine the source identifier 510 of a transaction in implementation specific ways. For example, some I/O bus protocols may provide the originating device identity as part of each I/O transaction. In other cases, such as for chipset integrated devices, the source identifier 510 may be implied based on the chipset's internal implementation.

For PCI Express devices, the source identifier 510 is mapped to the requestor identifier provided as part of the I/O transaction header. The requester identifier of a device is composed of its PCI Bus/Device/Function numbers assigned by the configuration software and uniquely identifies the hardware function that initiates the I/O request. In one embodiment, the source identifier 510 includes a function number 512, a device number 514, and a bus number 516. In the example illustrated in FIG. 5, the function number 512 is K-bit wide, the device number 514 is L-bit wide, and the bus number 516 is M-bit wide. The bus number 516 identifies the bus on which the I/O transaction is generated. The device number 514 identifies the specific device on the identified bus. The function number 512 identifies the specific function requested by the I/O device. The source identifier 510 is used to index or look up the root table 520 and the context tables $530_0$ to $530_U$. In the example illustrated in FIG. 5, there are two I/O transactions using bus 0 and bus m.

For PCI Express devices, the root table 520 stores root entries $525_0$ to $525_{M-1}$ indexed by the source identifier 510, or the bus number 516 of the source identifier 510. The root entries function as the top level structure to map devices on a specific bus to its respective parent domain. The root entry 0 $525_0$ corresponds to the I/O transaction using bus 0. The root entry m $520_m$ corresponds to the I/O transaction using bus m. The root entries 0 $525_0$ and $525_m$ point to the context table $530_0$ and $530_m$, respectively. In one embodiment, these entries provide the base address for the corresponding context table.

The context tables $530_0$ to $530_U$ store context entries $535_k$'s referenced by the root entries. The context entries $535_k$'s map the I/O devices to their corresponding domain(s). The device number 514 and the function number 512 are used to obtain the context entry corresponding to the I/O transaction. In one embodiment, they form an index to point to, or reference, the context table referenced by the corresponding root entry. There are $2^M * 2^L * 2^K$ or $2^{M+L+K}$ context entries. In one embodiment, K=3, L=5, and M=8, resulting in a total of 64K entries, organized as $2^M$ ($2^8$=256) context-entry tables. In the example shown in FIG. 4, the two context entries for the two I/O transactions are the context entry $535_0$ in the context table $530_0$ and the context entry $535_m$ in the context table $530_m$. The context entries $535_0$ and $535_m$ point to the address translation structures $540_0$ and $540_m$, respectively.

The address translation structures $540_0$ to $540_V$ provide the address translation to the host physical address using the guest physical address corresponding to the I/O transaction. Each of the address translation structures $540_0$ to $540_V$ may be a multi-table 550, a single table 560, or a base/bound 570 corresponding to the three translation mechanisms using multi tables, single table, and base/bound translations, respectively. In the following description, a regular page size of 4 KB is used. As is known by one skilled in the art, any other sizes may also be used.

To provide software flexible control of the DMA remapping circuit 135, the DMA remapping circuit 135 has a number of registers contained in the register set 220 shown in FIG. 2. The register set 220 is located in the host physical address space through a Base Address (BAR) register. The translation hardware BAR register is exposed to software in an implementation dependent manner. This may be exposed as a PCI configuration space register in one of the chipset integrated devices, such as the memory controller device. In one embodiment, the BAR register provides a minimum of 4K address window. A register in the register set 220 may have a number of fields. A field may be asserted or negated. When a field consists of only a single bit, assertion implies that the bit is set to a defined logical state (e.g., TRUE, logical one) and negation implies that the bit is reset to a defined logic state that is complementary to the state of the assertion (e.g., FALSE, logical zero). In the following, the use of an asserted or negated state is arbitrary. A field may be asserted to indicate a first state and negated to indicate a second state, or vice versa.

A field in a register may be programmed, initialized, or configured by the DMA remapping circuit 135 and/or by the software. It may also correspond to a specialized hardware circuit or a functionality implemented by a data structure, a function, a routine, or a method. In the following, field are grouped into registers. The grouping, formatting, or organization of these fields or bits in the following registers is for illustrative purposes. Other ways of grouping, formatting, or organizing these fields may be used. A field may also be duplicated in more than one registers. A register may have more or less than the fields as described. In addition, registers may be implemented in a number of ways, including as storage elements or memory elements.

Figure 6:
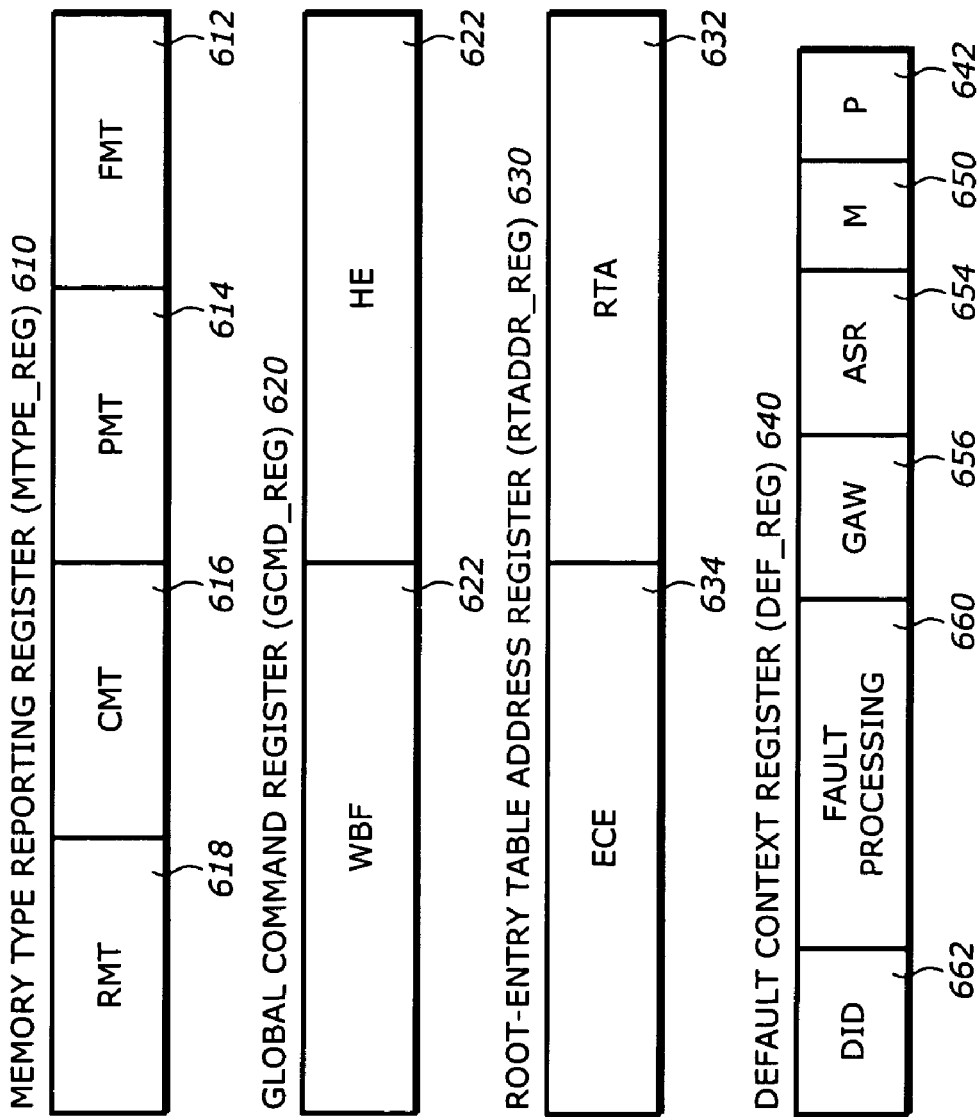
FIG. 6 is a diagram illustrating a register set containing common registers according to one embodiment of the invention.

FIG. 6 is a diagram illustrating a register set containing common registers according to one embodiment of the invention. The common registers include a memory type reporting register (MTYPE_REG) 610, a global command register (GCMD_REG) 620, a root entry table address register (RTADDR_REG) 630, and a default context register (DEF_REG) 640.

The MTYPE_REG 610 reports memory types of translation data structures. It includes a fault log memory type (FMT) field 612, a page table memory type (PMT) field 614, a context entry table memory type (CMT) field 616, and a root entry table memory type (RMT) field 618.

The FMT field 612 indicates whether the fault log region is cacheable. When negated, it indicates that the fault log region may be uncached. When asserted, it indicates that the fault log region may be in a cacheable region. The PMT field 614 indicates whether the page tables are cacheable. When negated, it indicates page tables may be in an uncached memory region. When asserted, it indicates that the page tables may be in a cacheable region. The CMT field 616 indicates whether the context tables are cacheable. When negated, it indicates context tables may be in an uncached memory region indicates context tables may be in a cacheable region. The RMT field 618 indicates whether the root table is cacheable. When negated, it indicates root table may be in an uncached memory region. When asserted, it indicates that root table may be in a cacheable region.

The GCMD_REG 620 controls the translation behavior. It includes a translation hardware enable (HE) field 622 and a write buffer flush (WBF) field 624.

The HE field 622 is a software programmable control field to enable or disable the translation hardware. When negated, it indicates to disable the translation hardware. When asserted, it indicates to enable translation hardware. When updating this field, the software should read back and check this field to confirm the enable/disable status.

The WBF field 624 is used to flush the chipset internal write buffers. This is done to ensure any updates to context table or page tables are not held in any internal write posting buffers. The software asserts this field to issue the write buffer flush command. The logic circuit 224 negates it to provide an indication of the write buffer flush completion. The software should read back and check the field to be negated to confirm the flush completion.

The RTADDR_REG 630 sets up the base address of memory resident root table. The software should program this register by writing to the lower double word (DWORD) last. It includes a root table base address (RTA) field 632 and an enable context entries (ECE) field 634. The RTA field 632 points to base of page aligned, regular-sized root table in system memory. A regular size may be any convenient pre-defined size. In one embodiment, the regular size is 4 KB. The DMA remapping circuit 135 may implement only the least significant N bits where N is the (host address width—12). The rest of the field may be treated as read only. The ECE field 634 is a control field to enable or disable the use of the context entries. This does not affect the use of the default context. When negated, it indicates disabling use of the context entry. DMA requests are processed based on programming of default register. When asserted, it indicates enabling use of the context entry to process DMA requests. The root and context tables are setup in memory and the base of root table is provided in the upper bits (e.g., bits 12 through 63).

The DEF_REG 640 specifies the default context. Each context entry in the context tables specifies how to manage DMA requests from a specific device. The default context represents a default domain to which devices managed by the DMA remapping circuit 135 are initially assigned until the software programs the device to domain mapping tables and enables the look-up of these tables. For example, upon hot-plug of an I/O device into the system, if a context for this device is not pre-programmed by software, the device is assigned to the default domain until software explicitly assigns it to another domain. The default context is programmed through the DEF_REG 640.

The translation hardware checks the source identifier in the DMA requests as follows. If the context entries are enabled (e.g., through a global command register), the source identifier in the incoming DMA request is used to lookup its corresponding root entry and, through the root entry, the context entry. In this case, the DMA is processed according to the programming of the root and context entries. If the context entries are not enabled, the DMA request is processed according to the DEF_REG 640.

Similar to other context entries, the default context can be programmed to enforce specific types of translation functions, such as blocking, pass through, address filtered, address translated using a translation structure, etc.

The DEF_REG 640 includes a present (P) field 642, a single/multi-level table (M) field 650, an address space root (ASR) field 654, a guest address width (GAW) field 656, a fault processing field 660, and a domain identifier (DID) field 662. Typically, the P field 642 and the M field 650 are one-bit indicators.

The P field 642 should be always checked when processing transactions. When negated, it indicates all transactions through this context entry is blocked. When asserted, it indicates process transactions through this context entry based on programming of other fields.

The M field 650 is used to indicate whether multi-level table translation is used. When asserted, it indicates that a single-level page table used for this context entry bits should be used to index the entries in the page table. When negated, it indicates a multi-level page table used for this context entry should be used to lookup the entries in the root table.

The ASR field 654 is a size-aligned host physical address of address space root. When using a contiguous address space, this field contains the base address of the domain's physical address space. When using page tables (single-level or multi-level), this field points to the base of root table.

The GAW field 656 is valid only for context entries specifying single or multi-level page tables. When using multi-level page tables, this field indicates the adjusted guest address width (AGAW) to be used by the DMA remapping circuit 135 for the page table walk. The value specified in this field is an AGAW value supported by the DMA remapping circuit 135 and reported in a capability register. The capability register is a register that indicates the capability supported by the DMA remapping circuit 135. When using single-level page tables, this field indicates the domain's guest address width. The value specified in this field is between the minimum GAW for single-level page tables and the MGAW value reported by the DMA remapping circuit 135 in the capability register.

If the DMA remapping circuit 135 detects a value in this field that is not supported by the underlying implementation, all DMA requests through this context entry are blocked and a translation fault results. Any DMA request processed through this context entry and accessing guest physical address above $2^{GAW}-1$ (where GAW is the value in this field) is blocked and results in a translation fault.

The FP field 660 enables or disables recording of faults by DMA requests processed through this context entry.

The DID field 662 indicates the domain identifier for the default domain.

Address Filtering:

The multi-level page table structure-based address translation provides the most flexibility by allowing the software to manage the memory at a regular (e.g., 4 KB) page granularity. However, the multi-level page-table structure incurs the most address translation latency since it requires the hardware to walk the page tables. Even though hardware implementations may utilize translation caches to reduce the translation overheads, the page walk latencies incurred on I/O Translation Lookaside Bus (TLB) misses may be unsuitable for certain types of I/O traffic. For example, DMA requests from PCI-Express devices, such as high-definition audio, using isochronous channels, and certain chipset integrated devices such as integrated graphics cannot incur the non-deterministic DMA remapping latencies.

For hardware implementations supporting I/O devices that may be negatively impacted by the DMA remapping latencies, the architecture defines assignment of devices to a non-relocated domain through DMA address filtering (instead of address translation). A non-relocated domain is a domain whose guest physical address space is a subset of the system's host physical address space. The address filtering hardware preserves the software flexibility to manage host memory in regular-sized (e.g., 4 KB) pages, and incurs only minimum overhead.

Support for address filtering is reported by the DMA remapping circuit 135 through the capability register in the register set 220. Hardware implementations, such as those not supporting isochronous channels, that are capable of address translating DMA requests from all devices are not required to support address filtering. If a platform configuration requires multiple DMA remapping hardware units such as one per chipset component or PCI-Express root port, and if address filtering support is required by one of the units, then it is supported by all the hardware units.

Figure 7:
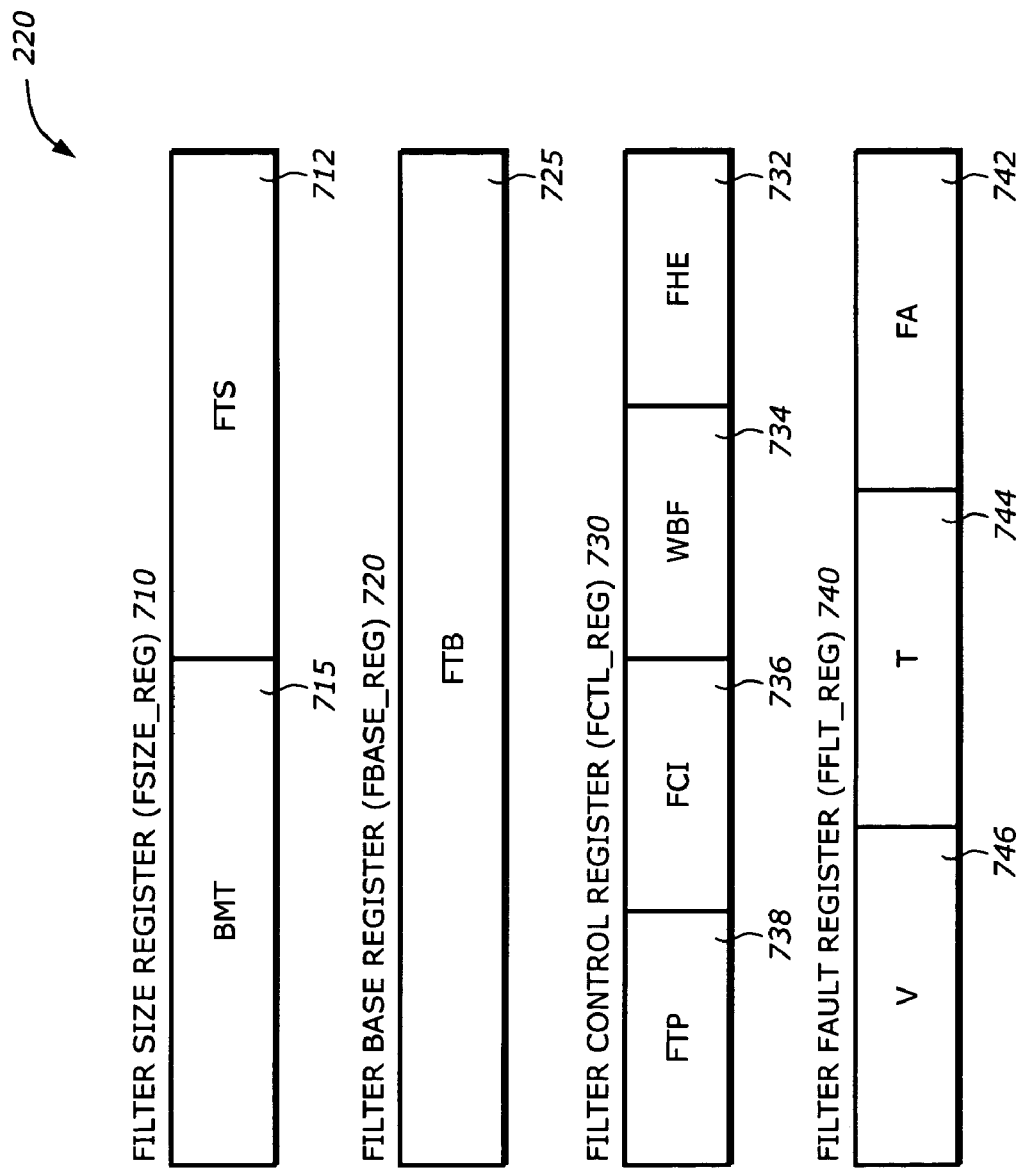
FIG. 7 is a diagram illustrating a register set containing address filtering registers according to one embodiment of the invention.

For address filtering, the pages in the memory allocated to the non-relocated domain are indicated through a memory-resident table referred as the Filter Bitmap Table as shown in FIG. 7. The architecture supports only a single non-relocated domain, and hence, a single filter bitmap table pointer per reported DMA-remapping hardware. The location and size of the filter bitmap table is programmed through the address filter base and size registers as shown in FIG. 7. The size of the bitmap table is computed as (4 KB*$2^S$), where S is the value programmed to the address filter size register. Each bit in the table represents a 4K host page, with the first bit representing the first 4K host physical address space. The minimum size of the filter bitmap table is 4 KB, which maps the first 128 MB region of the host memory.

Devices whose DMA requests can only be address filtered by hardware are reported by the platform firmware to software. Any programming of the context entries for these devices should ensure it is setup to address filter, and not to block, to allow as pass-through, or to address translate the DMA requests.

The I/O devices whose DMA requests can also be address translated or address filtered may be assigned to the non-relocated domain by programming the corresponding context entries to indicate address filtering. Similarly, the non-relocated domain could be made the same as the default domain by programming the default context register to indicate address filtering.

If a context entry is programmed to indicate address filtering, the rest of the context entry fields (other than Valid, Present and Pass-through fields) is ignored by the DMA remapping circuit 135.

The DMA requests processed through the context entries specifying address filtering are handled by the DMA remapping circuit 135 as follows:
1. The DMA request is validated to ensure it is accessing memory through the normal chipset DMA address decoding logic. If the DMA request is decoded as peer-to-peer, the DMA request is blocked.
2. If the DMA request is to memory, the memory location targeted by the DMA request is validated to be within a 4K page.
3. If the above two checks pass, the GPA in the DMA request is validated to be within the non-relocated domain's address space. Any DMA request attempting to access memory locations above address ($2^{(P+27)}-1$) is blocked, where P is the value programmed in the filter bitmap size register.
4. If all of the above checks pass, the DMA remapping circuit 135 looks up the bit field corresponding to the page accessed by the DMA request at bit offset [GPA>>12] in the filter bitmap table). If the bit is clear, the DMA request is processed as normal. If the bit is set, the DMA request is blocked.

FIG. 7 is a diagram illustrating the register set 220 containing address filtering registers according to one embodiment of the invention. The register set 220 includes a filter size register (FSIZE_REG) 710, a filter base register (FBASE_REG) 720, a filter control register (FCTL_REG) 730, and a filter fault register (FFLT_REG) 740.

The FSIZE_REG 710 indicates the size of the address filtering bitmap table. If the DMA remapping circuit 135 does not support address filtering, this register is treated as reserved (e.g., writes are ignored, and reads return 0). It includes a filter table size (FTS) field 712 and a filter bitmap memory type (BMT) field 715. The BMT field 715 indicates whether the bitmap region is cacheable. When negated, it indicates the bitmap region is uncached. Writes to this field are ignored. When asserted, it indicates the bitmap region may be in a cacheable region. The FTS field 712 indicates size of the address-filter table. The size is computed by the following formula. TableSize=4K*$2^{FSIZE\_REG}$ bytes. For example, 0000 h: 4 KB table supporting 128 MB memory, 0001 h: 8 KB table supporting 256 MB main memory, 0005 h: 128 KB table supporting 4 GB main memory, etc.

The FBASE_REG 720 holds the pointer to the base address of the address filtering bitmap table. If the DMA remapping circuit 135 does not support address filtering, this register is treated as reserved (e.g., writes are ignored, and reads return 0). It includes a filter table base (FTB) field 725. The FTB field 725 is a pointer to the base address of address filter table in the memory. The table is size-aligned. The smallest table size is 128K supporting 4 GB addressability.

The FCTL_REG 730 controls caching of the address filter bitmap table. If the DMA remapping circuit 135 does not support address filtering, this register is treated as reserved (e.g., writes are ignored, and reads return 0). It includes a filter hardware enable (FHE) field 732, a write buffer flush (WBF) field 734, a filter cache invalidate (FCI) field 736, and a filter table protect (FTP) field 738. The FHE field 732 is a software programmable control field to enable or disable the address-filtering hardware. When negated, it indicates disabling the address filtering hardware. Any DMA request that is otherwise address filtered is processed as pass through. When asserted, it indicates enabling the address filtering hardware. The filter base and size registers are programmed before enabling address filtering hardware through this field. The WBF field 734 is used to flush the chipset internal write buffers. This is done to ensure filter bitmap table updates are not held in any internal write posting buffers. The software asserts this field to issue the write buffer flush command. The DMA remapping circuit 135 negates it to provide indication of write buffer flush completion. The software should read back and check the field to be negated to confirm flush complete. The FCI field 736 invalidates address filter bitmap cache. The software asserts this field to request address filter cache invalidation. The DMA remapping circuit 135 negates it to indicate invalidation completion. The software should read back and check this field to be negated to confirm invalidation completion. The FTP field 738 indicates protecting the address filter bitmap region. When it is asserted by software, the hardware starts protecting the address filter bitmap region from DMA accesses. The software should read this field and check it to be asserted to confirm that the address filter bitmap region is protected. When it is negated by software, the DMA remapping circuit 135 stops protecting the address filter bitmap region from DMA accesses.

The FFLT_REG reports faults detected by address filtering hardware. If the DMA remapping circuit 135 does not support address filtering, this register is treated as reserved (e.g., writes are ignored, and reads return 0). It includes a Faulting Address (FA) field 742, a Type (T) field 744, and a Valid (V) field 746. The FA field 742 is a frame address of the location accessed by the faulting DMA request. The T field 744 indicates the memory access type of faulted DMA request. When negated, it indicates DMA Write. When asserted, it indicates DMA Read request. The V field 746 indicates if the page frame address of the faulting DMA request is latched. When it is asserted, the page frame address of the faulting DMA request is latched in the faulting address field and no further address filtering fault addresses are latched. The software should explicitly negate this field through writes to re-enable address filtering fault recording.

Figures 8A, 8B, 8C:
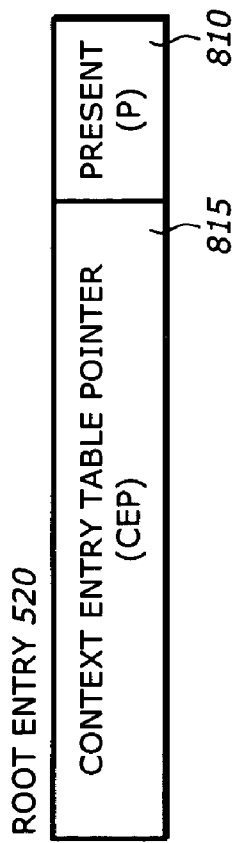
FIG. 8A is a diagram illustrating a root entry according to one embodiment of the invention.
FIG. 8B is a diagram illustrating a context entry according to one embodiment of the invention.
FIG. 8C is a diagram illustrating a page table entry according to one embodiment of the invention.

FIG. 8A is a diagram illustrating the root entry 520 according to one embodiment of the invention. The root entry 520 includes a present (P) field 810 and a context entry table pointer (CEP) field 815.

The P field 810 indicates if the root entry is present. When negated, it indicates that the root entry is not present and should not be used. The DMA remapping circuit 135 faults the DMA request processed through this root entry. When asserted, it indicates that the root entry is present and can be used to process the transaction.

The CEP field 815 is a pointer to the context table for this bus. The context table is 4 KB in size and page aligned.

FIG. 8B is a diagram illustrating the context entry 535 according to one embodiment of the invention. The context entry 535 includes a Present (P) field 822, a Multi-level (M) field 830, an Address Space Root (ASR) field 834, a Guest Address Width (GAW) field 836, a Fault Processing (FP) field 840, and a Domain Identifier (DID) field 842. The context entry 535 has fields that are similar to the default register DEF_REG 640 shown in FIG. 6. Typically, the P field 822 and the M field 830 are one-bit indicators.

The P field 822, the M field 830, the ASR field 834, and the GAW filed 836 are similar, respectively, to the P field 642, the M field 650, the ASR field 654, and the GAW field 656 in the default register (DEF_REG 640) shown in FIG. 6.

The DID field 842 is an identifier for the domain to which this context entry belongs to. The software should ensure that all devices use the same page table structures, and hence have addresses translated identically, have the same domain identifier in their context entries. The DMA remapping circuit 135 may use the domain identifier for tagging its cached entries when cache support is used.

FIG. 8C is a diagram illustrating a page table entry (PTE) 565 according to one embodiment of the invention. The PTE 565 includes a Readable (R) field 850, a Writable (W) field 852, a Coherent (C) field 854, a Super page (SP) field 856, and an address (ADDR) field 860. Note that more or less fields than these fields may be defined.

The R field 850 indicates if a page is readable for DMA. When negated, it indicates the page is not accessible to DMA read requests. DMA read requests processed through this page table entry are blocked. If fault reporting is enabled, a translation fault is generated. When asserted, it indicates the page is accessible to DMA read requests.

The W field 852 indicates if page is writable for DMA. When negated, it indicates the page is not accessible to DMA write requests. DMA write requests processed through this page-table entry are blocked. If fault reporting is enabled, a translation fault is generated. When asserted, it indicates the page is accessible to DMA write requests.

The C field 854 specifies if the access to the translated host physical address is coherent or not. When negated, it indicates that the DMA access to the translated host physical address follows the coherency attribute specified in the I/O transaction. For example, PCI-X or PCI-Express requests with "no-snoop" attribute set access the translated host physical address without being snooped. When asserted, it indicates that DMA access to the translated host physical address is processed as coherent. The software should make sure this field is treated as reserved (0) when: In all page table entries, if the DMA remapping circuit 135 does not support the asserted setting of the C field (as reported in the capability register), and in non-leaf page-table entries with SP field being negated.

The SP field 854 indicates to the DMA remapping circuit 135 that this is a leaf page table entry and complete page walk. When negated, it indicates continuing with the page walk and using the next level table. When asserted, it indicates stopping the table walk and forming the host physical address using the unused lower bits in the guest physical address for the page walk along with the upper bits of the page base address provided in the ADDR field 860. The DMA remapping circuit 135 evaluates the SP field 854 only in the page table entries corresponding to the super-page sizes it supports as reported in the capability register. The software should treat this field as reserved (e.g., 0) in: (1) 4 KB leaf page table entries in multi-level page tables, (2) non-leaf page table entries in multi-level page tables corresponding to super-page sizes not supported by the DMA remapping circuit 135, and (3) page table entries in single level page tables.

The ADDR field 860 contains the Host Physical Address of the page frame if this is a leaf node. Otherwise it contains the pointer to the next level page table. This field is size-aligned.

Note that additional fields may be defined to further characterize the attributes of the address translation mechanism. For example, the following attributes may be defined: a base/bound attribute to enable base/bounds translation, a stride attribute to indicate size of a first level page table in the multi-level table translation, and a pass through attribute to indicate if the I/O transaction is allowed to pass through without translation.

Address Translation Mechanisms:

To support varying granularity of the physical memory management support by software, the DMA remapping architecture defines three types of address translation structures. A chipset implementation may support one or more of these translation structures and report the supported types through its capability register. These mechanisms offer varying cost, complexity, and performance trade-offs. For implementations supporting multiple translation structures, each context entry may be programmed to use different translation structure types.

The following address translation structures are defined: (1) Multi-level page table structure to enable page-granular allocation of regions through multiple levels of page-sized page-tables, each within page-sized regions; (2) Single level page table structure to enable page-granular allocation of regions through a single contiguous page table and (3) Base/Bounds translation structure to enable a contiguous region allocation to domains. Any one of the above translation structures may be selected as default or optional.

Figure 9A:
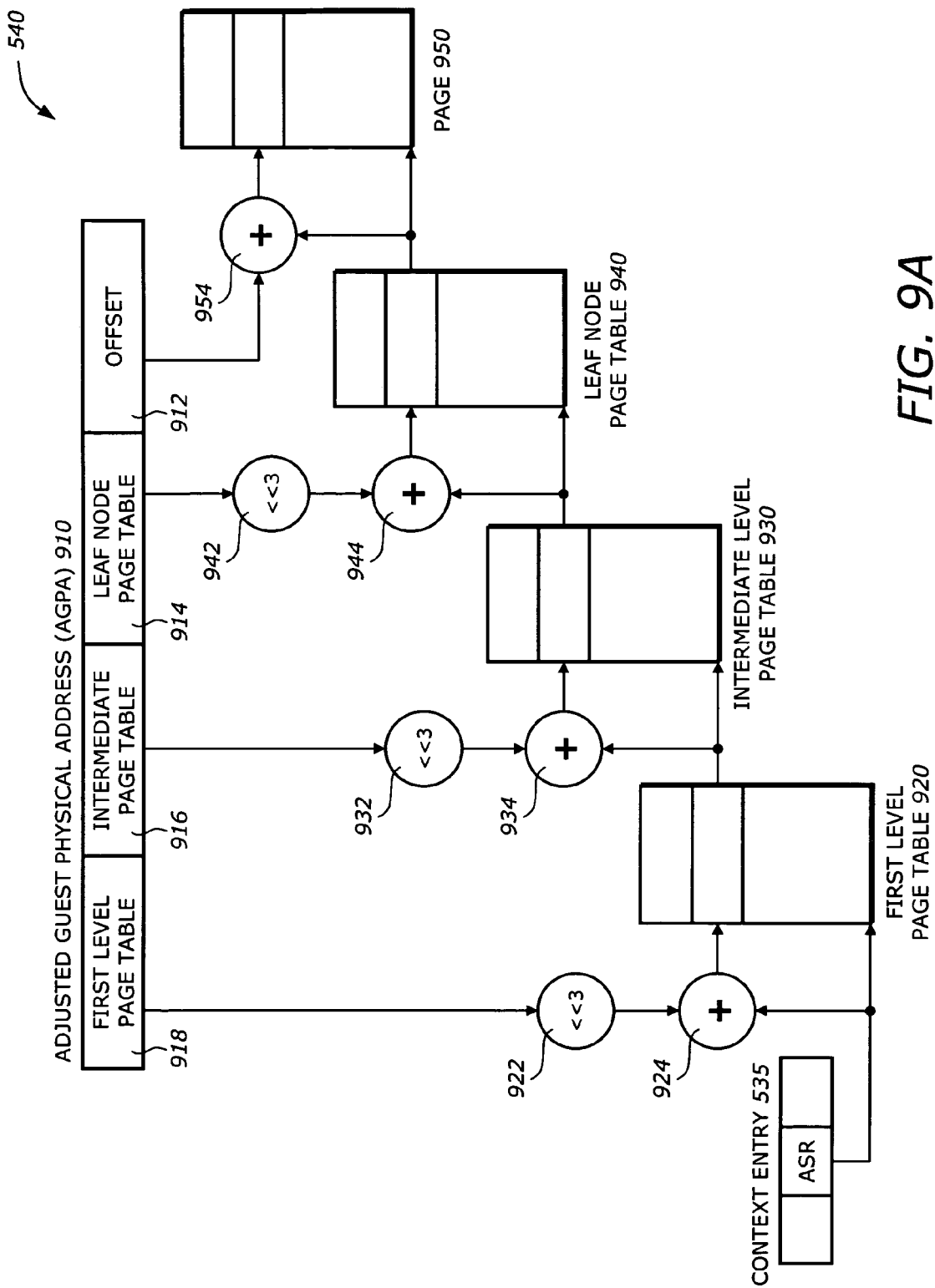
FIG. 9A is a diagram illustrating an address translation structure using multi-level tables according to one embodiment of the invention.

FIG. 9A is a diagram illustrating the address translation structure 540 using multi-level tables according to one embodiment of the invention. The address translation structure 540 includes the context entry 535, an adjusted guest physical address (AGPA) 910, a first level page table 920, an intermediate table 930, a leaf node table 940, and a page 950. The multi-level tables include a number of translation tables arranged in a hierarchical manner.

The ASR field in the context entry 535 provides the base address for the first level page table 920. The AGPA 910 includes an offset field 912, a leaf node page table field 914, an intermediate page table field 916, and a first level page table field 918. It should be noted that the number of levels in the multi-level page tables may be any suitable number depending on the width of the AGPA 910, the memory space, the memory management policy, the word length, and any other implementation factors.

The first level page table field 918 is combined with the first level base address provided by the ASR to index the first level page table 920. In one embodiment, each entry is 8 bytes, the first level page table field 918 is shifted by three bits by a shifter 922 and then added to the first level base address by an adder 924 to provide a first level index to the first level page table 920. The indexed first level page table entry provides the intermediate base address for the intermediate level page table 930.

The intermediate page table field 916 is combined with the intermediate base address to index the intermediate level page table 930. Since each entry is 8 bytes, the intermediate page table field 918 is shifted by three bits by a shifter 932 and then added to the intermediate level base address by an adder 934 to provide an intermediate level index to the intermediate level page table 930. The indexed intermediate level page table entry provides the leaf node base address for the leaf node page table 940.

The leaf node page table field 914 is combined with the leaf node base address to index the leaf node page table 940. Since each entry is 8 bytes, the leaf node page table field 914 is shifted by three bits by a shifter 942 and then added to the leaf node base address by an adder 944 to provide a leaf node index to the leaf node page table 940. The indexed leaf node page table entry provides the host base address for the page 950.

The offset 912 is then combined with the host base address to generate the host physical address in the page 950.

The multi-level page tables allow the software to manage the host physical memory at page (e.g., 4K) granularity and setup a hierarchical structure with page-directories and page-tables. The logic circuit 224 implements the page walk logic and traverses these structures using the GPA provided in the DMA transaction. The maximum number of page-table levels that needs to be traversed to translate a GPA in a DMA request is a function of the guest address width of the corresponding context entry. The software can query the maximum guest address width supported by a given hardware implementation of the DMA remapping circuit 135 through a capability register.

Let P be the regular page size. Let Q be the number of bytes per entry. Let p and q be such that $2^p = P$ and $2^q = Q$. The Adjusted Guest Address Width (AGAW) for a domain is its guest address width (GAW) value adjusted, such that (AGAW-p) is a multiple of (p-q). The AGAW is determined as follows,

```
R = (GAW - p) MOD(p-q);
if(R == 0) {
    AGAW = GAW;
} else {
    AGAW = GAW + (p-q) - R;
}
```

For example, suppose P=4K and Q=8, then p=12 and q=3. A domain to which 2 GB of memory is allocated has a GAW of 31. The AGAW is computed as:

$R = (31-12) \bmod 9 = 1$ $AGAW = 31 + 9 - 1 = 39$

The Adjusted Guest Address Width (AGAW) indicates the number of levels of the page walk. The DMA remapping circuit 135 supports a defined AGAW where the corresponding GAW is equal to the host address width. When using multi-level page tables for a domain, the software computes the Adjusted Guest Address Width (AGAW) as described above. The software uses the AGAW when setting up the multi-level page table structures. It programs the domain's GAW and AGAW in context entries for all devices assigned to this domain.

The DMA remapping circuit 135 may also support smaller adjusted guest address widths. It may report the supported adjusted guest address widths through the capability register. The software should ensure that it uses an AGAW supported by the underlying hardware implementation when setting up multi-level page tables for a domain. The software should also program the domain's AGAW in the context entries for devices assigned to this domain.

The DMA requests processed through context entries specifying multi-level address translations are handled by the DMA remapping circuit 135 as follows:

1. The GPA/Length combination specified in the DMA request is used according to whether the DMA remapping circuit 135 supports page boundary crossing or not. If the DMA remapping circuit 135 supports DMA requests that cross page boundary, and the GPA/Length combination indicates the DMA request crossing page boundary, then each page region targeted by the DMA request is address translated independently. If the DMA remapping circuit 135 does not support DMA requests that cross page boundary, and the GPA/Length combination indicates the DMA request crossing page boundary, then an address translation fault results.

2. If the GAW field programmed in the context entry is not an adjusted guest address width supported by the DMA remapping circuit 135, which is reported in the capability register, then the DMA request is blocked, and an address translation fault results.

3. The GPA in the DMA request is validated to be within the guest physical address space of the domain to which the device is assigned. Any DMA request attempting to access memory locations above address $(2^X-1)$ is blocked, where X is the guest address width programmed in the context entry used to process this DMA request.

4. If the above checks are successful, the GPA in the DMA request is adjusted to X bits, to form an adjust guest physical address (AGPA), where X is the guest address width programmed in the context entry used to process this DMA request. The DMA request to the AGPA is either blocked or translated to a valid HPA according to the programming of the multi-level page table structures.

5. The DMA remapping circuit 135 performs the normal chipset address decoding of the HPA generated by step 4, and processes the DMA request as either an access to memory or a peer-to-peer request.
6. If the translated HPA is decoded to be destined to memory, the HPA is accessed according to support for setting the Coherency (C) attribute. If the DMA remapping circuit 135 supports only the negated setting of the Coherency (C) attribute in the page-table entries, the memory is accessed according to the coherency specified (or inferred from) in the DMA request. For example, if the PCI Express request specified the DMA request as non-snooped, the memory is accessed without being snooped. If the DMA remapping circuit 135 supports the asserted and negated settings of the Coherency (C) attribute in the page-table entries, the memory is accessed according to the programming of the coherency attribute in the leaf page-table entry used to address translate the DMA request.

Figure 9B:
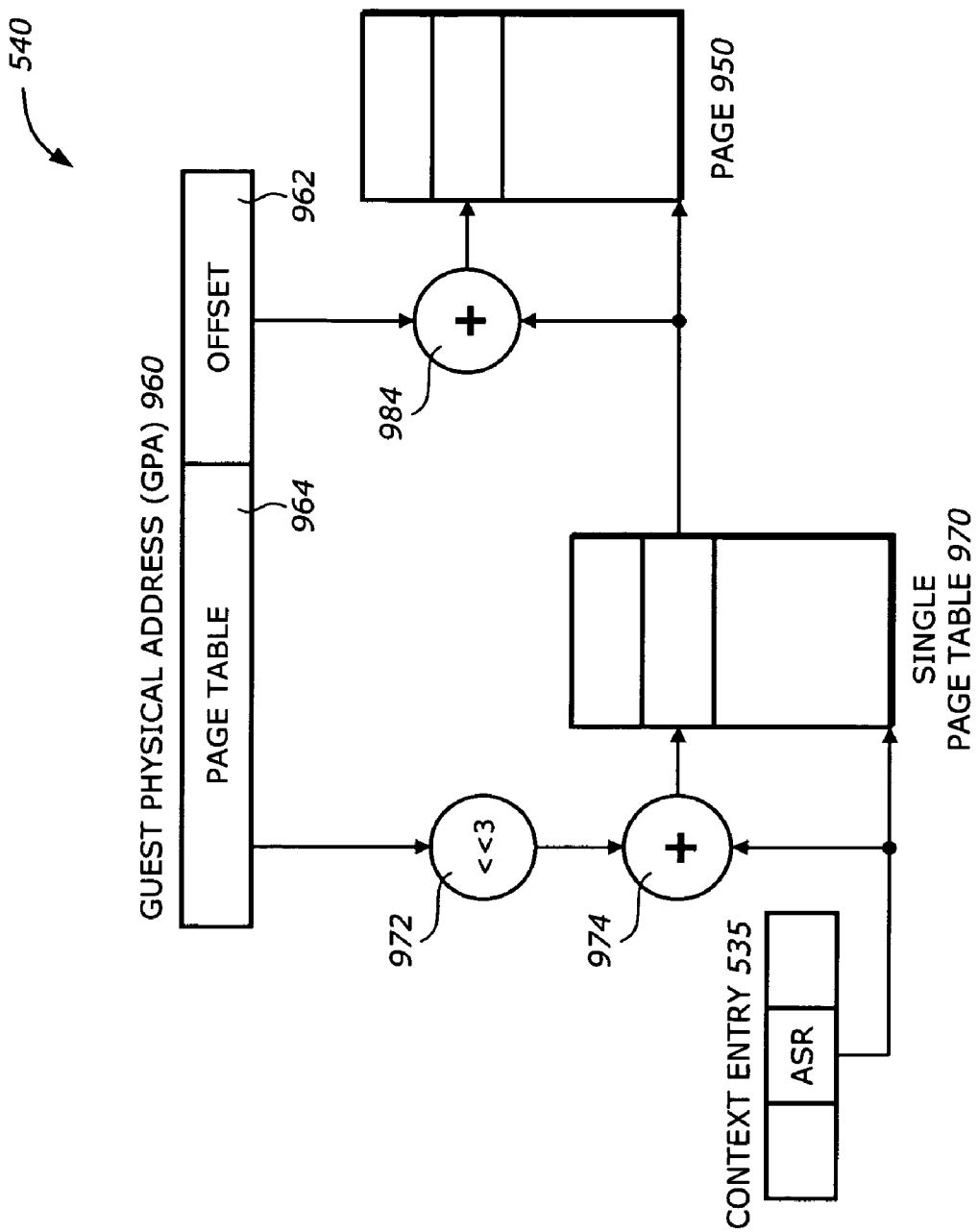
FIG. 9B is a diagram illustrating an address translation structure using a single table according to one embodiment of the invention.

FIG. 9B is a diagram illustrating the address translation structure 540 using a single table according to one embodiment of the invention. The address translation structure 540 includes the context entry 535, a guest physical address (GPA) 960, a single page table 970, and a page 980.

The single level page table offers software an alternative mechanism to provide 4K granular page allocations without long page walks, but at the expense of reserving a large contiguous page-table structure. The page table entry size (e.g., 64 bits) and format for the single level page table are similar to those of the page table entries for the multi-level structure described in previous sections, except that the stride field is treated as reserved.

The size of the page table depends on the size of the guest's address space. For example, for a guest addressability of 1 GB (GAW=30), the software needs to allocate a 2 MB page table, with 218 page-table entries. The I/O translation lookaside buffer (TLB) is also applicable to DMA address translations using single-level page table.

The DMA requests processed through context entries specifying single level address translations are handled by the DMA remapping circuit 135 as follows:
1. The GPA/Length combination specified in the DMA request is used according to whether the DMA remapping circuit 135 supports page boundary crossing or not. If the DMA remapping circuit 135 supports DMA requests that cross page boundary, and the GPA/Length combination indicates the DMA request crossing page boundary, each page region targeted by the DMA request is addressed translated independently. If the DMA remapping circuit 135 does not support DMA requests that cross page boundary, and the GPA/Length combination indicates the DMA request crossing page boundary, an address translation fault results.
2. If the GAW field programmed in the context entry is not between a minimum value, e.g., 21, and the maximum guest address width (MGAW) reported by the DMA remapping circuit 135 in the capability register, the DMA request is blocked, and an address translation fault results.
3. The DMA request is validated to be accessing addresses within the guest physical address space of the domain to which the device is assigned. Any DMA request attempting to access memory locations above ($2^X-1$) is blocked, where X is the guest address width (GAW field) programmed in the context entry used to process this DMA request.
4. If the above checks are successful, the DMA remapping circuit 135 uses bits (X−1):12 to look up the page table entry in the single level page table. The DMA request is either blocked or translated to a valid HPA according to the programming of the page table entry.
5. The DMA remapping circuit 135 performs the normal chipset address decoding of the HPA generated by step 4, and processes the DMA request as either an access to memory or a peer-to-peer request.
6. If the translated HPA is decoded to be destined to memory, the HPA is accessed according to support for setting the Coherency (C) attribute. If the DMA remapping circuit 135 supports only the negated setting of the Coherency (C) attribute in the page table entries, the memory is accessed according to the coherency specified (or inferred from) in the DMA request. For example, if the PCI Express request specified the DMA request as non-snooped, the memory is accessed without being snooped. If the DMA remapping circuit 135 supports the asserted and negated settings of the Coherency (C) attribute in the page table entries, the memory is accessed according to the programming of the coherency attribute in the page table entry used to address translate the DMA request.

The ASR field of the context entry 535 provides the base address to locate the page single table 970. The GPA 960 includes an offset field 962 and a page table field 964. The single page table 970 contains page table entries to point to the page of the host physical address corresponding to the GPA 960.

To look up the corresponding page table entry, the page table field 964 is combined with the base address provided by the ASR field. Since each entry occupies 8 bytes, the page table field 964 is shifted by 3 bits by a shifter 972 and then added to the ASR by an adder 974 to provide the index to the single page table 970.

The page table entry corresponding to the index then provides the base address for the page 980. The offset field 962 is added to this base address by an adder 984 to provide the resulting HPA in the page 980.

Figure 9C:
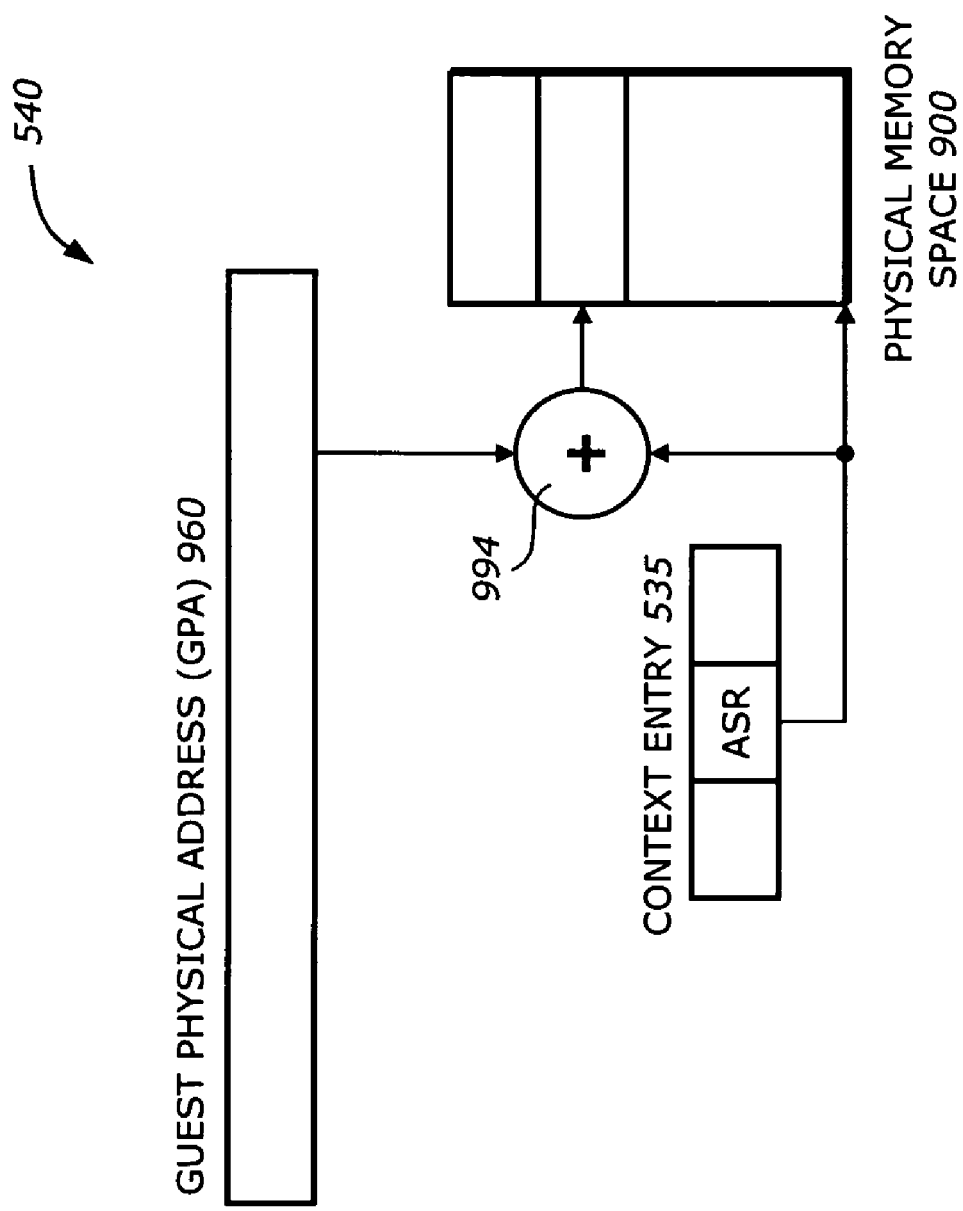
FIG. 9C is a diagram illustrating an address translation structure using base/bound translation according to one embodiment of the invention.

FIG. 9C is a diagram illustrating the address translation structure 540 using the base/bound translation according to one embodiment of the invention. The address translation structure 540 includes the context entry 535, a guest physical address (GPA) 960, and a physical memory space 990.

The base-bounds provide the simplest form of address translation where the GPA in the DMA request is used as an offset from the base address for that domain. The base address of the domain is a host physical address and is programmed through the ASR field 834 of the context entry 535 (FIG. 8B). The Guest Address Width (GAW) in the context entry indicates the offset limit. Any DMA request with guest address above the limit indicated by GAW is blocked by the DMA remapping circuit 135.

In one embodiment, the host physical address is 64-bit. For valid guest addresses (e.g., addresses within GAW addressability), the DMA remapping circuit 135 performs the following operations to generate the host physical address:

Host Physical Address [63:GAW]=Address Space Root [63:GAW]

Host Physical Address [GAW−1:0]=Guest Physical Address [GAW−1:0]

Cache Support:

The DMA remapping circuit 135 includes logic circuits to cache the context entries to reduce the overhead and latency incurred when fetching the context entries from the memory. The DMA remapping circuit 135 manages the context entry cache and supports cache invalidation requests by software.

The software should invalidate the context entry cache whenever it updates any root entries or context entries in memory. The invalidation of the context entry cache may be required on any/all types of updates to the root and context entries including updates that involve changing them from being not-present to present.

The DMA remapping architecture enables implementations to tag context cache entries with their respective domain identifier. The DMA remapping architecture defines the following types of context cache invalidation requests to support various software usage models: (1) Global Invalidation: All cached context entries are invalidated through a global invalidate; (2) Domain Selective Invalidation: All cached context entries belonging to a specific domain (with the specified domain identifier) are invalidated through a domain selective invalidate; and (3) Device Selective Invalidation: The cached context entry corresponding to a specific device (with the specified source identifier and domain identifier) is invalidated through a device selective invalidate.

The DMA remapping circuit 135 allows the software to specify any of the above three types of invalidation requests, but may perform the actual invalidation at a coarser granularity if the requested invalidation granularity is not supported. For example, it may perform a domain selective invalidation on a device selective invalidation request if it does not support device selective invalidations. The DMA remapping circuit 135 may indicate to the software the granularity at which the actual invalidation was performed.

The DMA remapping architecture defines support for caching leaf page table entries for improved address translation performance. The page table entry cache is referred to as the I/O translation look-aside buffer (I/O TLB). Similar to the context entry cache, the DMA remapping circuit 135 manages the I/O TLB, and supports invalidation requests by the software.

The software invalidates the cached page table entries in the I/O TLB whenever it updates any of the active page tables in memory. The invalidation of the I/O TLB may be required on any/all types of updates to the page table entries including updates that involve changing only the read/write attributes or programming them from no-present to present.

The DMA remapping circuit 135 tags the cached page table entries in the I/O TLB with the domain identifier. The domain identifier is programmed by the software through the context entries. If multiple context entries reference the same page tables as may be the case when multiple devices are assigned to the same domain, the software programs these context entries with the same domain identifier.

The DMA remapping circuit 135 defines the following types of I/O TLB invalidation requests to support various software usage models: (1) Global Invalidation: All cached page tables entries in the I/O TLB are invalidated through a global invalidate; (2) Domain Selective Invalidation: All cached page tables entries belonging to a specific domain, with the specified domain identifier, are invalidated through a domain selective invalidate; and (3) Page Selective Invalidation: A specified cached page table entry corresponding to the specified guest physical address (GPA) in a particular domain is invalidated through a page selective invalidate.

The DMA remapping circuit 135 allows the software to specify any of he above three types of invalidation requests, but may perform the actual invalidation at a coarser granularity if the requested invalidation granularity is not supported. For example, it may perform a domain selective invalidation on a page selective invalidation request if it does not support page selective invalidations. The DMA remapping circuit 135 indicates to the software the granularity at which the actual invalidation was performed.

To improve address filtering performance, the DMA remapping circuit 135 may also define support for caching the filter bitmap fields. If the memory locations accessed by DMA requests are sufficiently linear, and if there are sufficient cache entries for all the I/O streams in the platform, the filter bitmap cache would have a high hit rate. Similar to the context cache and I/O TLB, the DMA remapping circuit 135 manages the filter bitmap cache, and supports invalidation requests from software. The software is expected to explicitly invalidate the filter bitmap cache when pages are added or removed to the non-relocated domain.

For multi-level page table translations, the tables are cached at each level. For N levels, there are N cached tables. These cache tables may be implemented in one cache structure or N separate cache structures (one for each level). By having a separate and independent cache structure at each level, performance is improved. Any invalidation or flushing is performed at each table independently of one another. Furthermore, the address translation mechanism only accesses memory when there is a cache miss. Typically, the non-leaf caches map into large guest address regions, therefore, the chance to hit the non-leaf caches is high, leading to fast translation.

FIG. 10 is a diagram illustrating the register set 220 containing cache control registers according to one embodiment of the invention. The register set 220 includes a context command register (CCMD_REG) 1010, an I/O translation look-aside buffer invalidate register (IOTLB_REG) 1020, and an invalidate address register (IVA_REG) 1030.

The CCMD_REG 1010 manages the context entry cache. It includes an invalidate context entry cache (ICC) field 1012, an invalidation request granularity (IRG) field 1014, an actual invalidation granularity (AIG) field 1016, a domain identifier (DID) 1018, and a source identifier (SID) field 1019.

The ICC field 1012 is asserted by the software to request invalidation of the context entry cache. The software also sets the requested invalidation granularity by programming the IRG field. The software should ensure that an invalidation request is made to the DMA remapping circuit 135 only when the ICC field is negated, i.e., there is only one context entry cache invalidation request in the DMA remapping circuit 135 at a time.

The DMA remapping circuit 135 negates the ICC field to indicate the invalidation request is complete. The DMA remapping circuit 135 also indicates the granularity at which the invalidation operation was performed through the AIG field. The software should read back and check the ICC field to be negated to confirm the invalidation is complete.

The IRG field 1014 is used by the software to request the DMA remapping circuit 135 to invalidate the context entry cache. The software writes the requested invalidation granularity through this field.

In one embodiment, the IRG field 1014 in encoded by two bits as follows:

00: Reserved. The DMA remapping circuit 135 ignores the invalidation request and reports invalidation complete by clearing the ICC field and reporting 00 in the AIG field. An invalid programming error is reported through the error-status register.

01: Global Invalidation request.

10: Domain selective invalidation request. The target domain identifier is specified in the DID field.

11: Device selective invalidation request. The target SID is specified in the SID field, and the domain identifier (programmed in the context-entry for this device) is provided in the DID field.

The AIG field 1016 is used by the DMA remapping circuit 135 to report the granularity at which an invalidation request was processed at the time of reporting invalidation completion (by clearing the ICC field).

In one embodiment, the AIG field 1016 is encoded by two bits as follows:
00: Reserved. This is the value on reset.
01: Global Invalidation performed. This may be in response to a global, domain selective or device selective invalidation request.
10: Domain selective invalidation performed using the domain identifier that was specified by the software in the DID field. This may be in response to a domain selective or device selective invalidation request.

Depending on the invalidation granularities supported by an implementation of the DMA remapping circuit 135, an invalidation request may be processed by performing invalidation at a coarser granularity. The DMA remapping circuit 135 indicates completion of the invalidation request by negating the ICC field. At this time, the DMA remapping circuit 135 also indicates the granularity at which the actual invalidation was performed through the AIG field 1016.

The DID field 1018 indicates the identifier of the domain whose context entries need to be selectively invalidated. The SID field 1019 indicates the identifier of the device whose corresponding context entry needs to be selectively invalidated.

The IOTLB_REG 1020 controls the page-table entry caching. It includes an invalidate of I/OTLB (IVT) field 1022, an invalidation request granularity (IRG) field 1024, an actual invalidation granularity (AIG) field 1026, and a domain identifier (DID) field 1028.

The IVT field 1022 is asserted by the software to request invalidation of the I/O TLB. The software also sets the requested invalidation granularity by programming the IRG field. The software should ensure that an invalidation request is made to the DMA remapping circuit 135 only when the IVT field is negated, i.e., there is only one I/O TLB invalidation request pending in the DMA remapping circuit 135 at a time.

The DMA remapping circuit 135 negates the IVT field 1022 to indicate the invalidation request is complete. The DMA remapping circuit 135 also indicates the granularity at which the invalidation operation was performed through the AIG field 1026. The software should read back and check the IVT field 1022 to be negated to confirm the invalidation is complete.

The IRG field 1024 is used by the software to request the DMA remapping circuit 135 to invalidate the I/O TLB. The software writes the requested invalidation granularity through this field.

In one embodiment, the IRG field 1024 in encoded by two bits as follows:
00: Reserved. The DMA remapping circuit 135 ignores the invalidation request and reports invalidation complete by negating the IVT field 1022 and reporting 00 in the AIG field 1026. An invalid programming error is reported through the error status register.
01: Global Invalidation request.
10: Domain selective invalidation request. The target domain identifier is specified in the DID field 1028.
11: Device selective invalidation request. The target SID is specified in the SID field, and the domain identifier (programmed in the context-entry for this device) is provided in the DID field 1028.

The AIG field 1026 is used by the DMA remapping circuit 135 to report the granularity at which an invalidation request was processed at the time of reporting invalidation completion (by negating the IVT field 1022).

In one embodiment, the APG field 1026 in encoded by two bits as follows:
00: Reserved. This is the value on reset.
01: Global Invalidation performed. This may be in response to global, domain selective or page selective invalidation request.
10: Domain selective invalidation performed using the domain identifier that was specified by the software in the DID field 1028. This may be in response to a domain selective or page selective invalidation request.
11: Page selective invalidation performed using the address that was specified by the software in the invalidate address register. This can only be in response to a page selective invalidation request.

Depending on the invalidation granularities supported by a hardware implementation, an invalidation request may be processed by performing invalidation at a coarser granularity. The DMA remapping circuit 135 indicates completion of the invalidation request by negating the IVT field 1022. At this time, the DMA remapping circuit 135 also indicates the granularity at which the actual invalidation was performed through the AIG field 1026.

The DID field 1028 indicates the domain to be flushed or invalidated.

The IVA_REG 1030 provides the guest physical address (GPA) whose corresponding I/O TLB entry will be invalidated through the IOTLB_REG 1020. The IVA_REG 1030 includes a guest physical address (GPA) field 1032. The GPA field 1032 is used by the software to request a page specific invalidation request to the DMA remapping circuit 135. The software first writes the corresponding guest physical address to this register, and then issues a page specific invalidate command through the IOTLB_REG 1020.

The DMA remapping circuit 135 may implement only the least significant N bits of this field, where N is the (Host Address Width—12). The rest of the bits may be treated as read-only (0).

Figure 11:
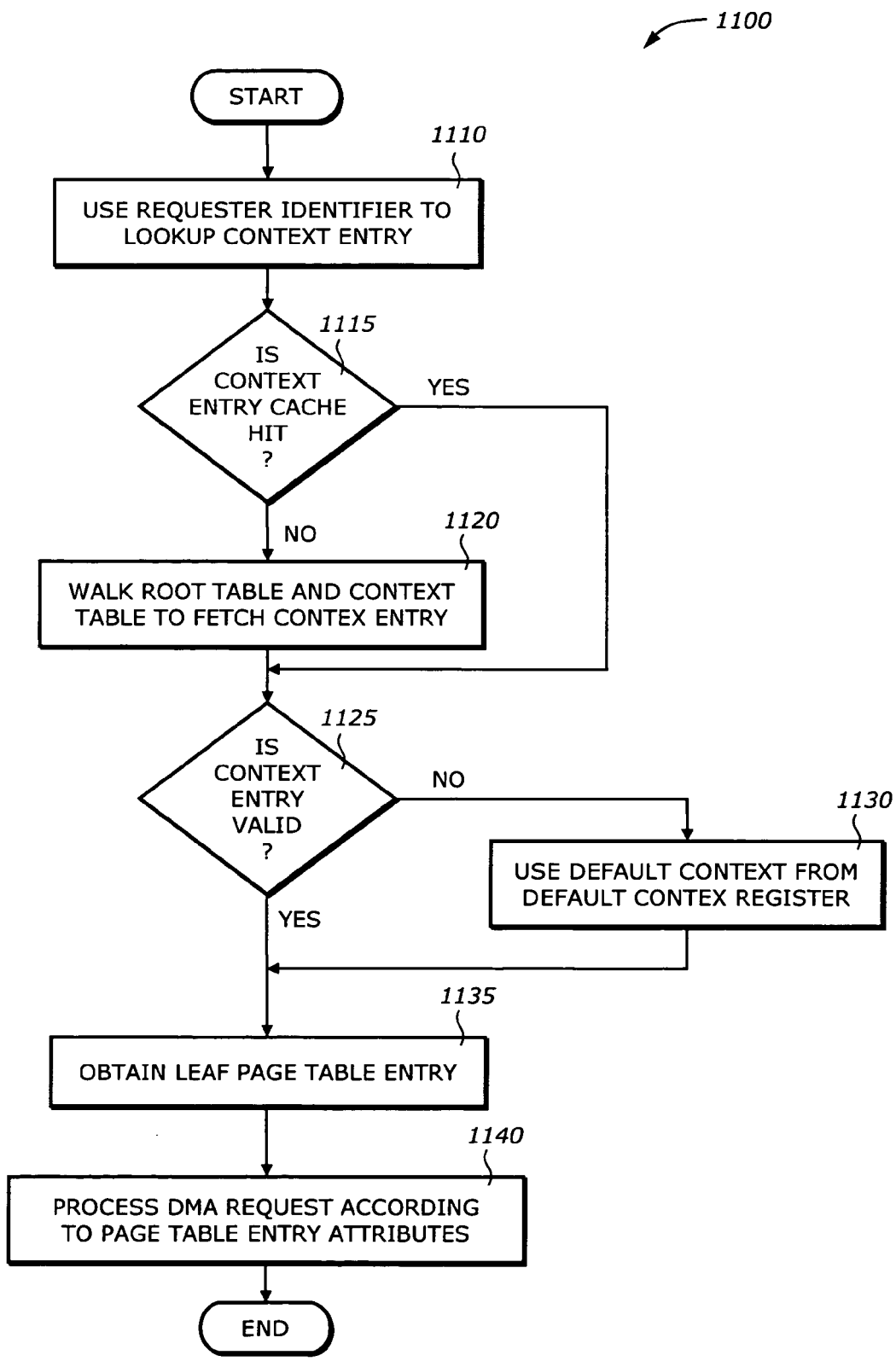
FIG. 11 is a flowchart illustrating a process to perform address translation with cached table structure according to one embodiment of the invention.

FIG. 11 is a flowchart illustrating a process 1100 to perform address translation with cached table structure according to one embodiment of the invention.

Upon START, the process 100 uses the requestor identifier to look up the context entry (Block 1110), Next, the process 1100 determines if there is a context entry cache hit (Block 115). If so, the process 1100 proceeds to Block 1125. Otherwise, the process 100 walks the root table and the context tables to fetch the context entry (Block 1120). Then, the process 1100 determines if the context entry is valid (Block 1125). This may be performed by examining the V field in the context entry. If the context entry is not valid, the process 100 uses the default context from the default context register (Block 1130) and proceeds to Block 1135. Otherwise, the process 1100 obtains the leaf page table entry (Block 1135). The leaf page table entry is the entry in the last table. Next, the process 100 processes the DMA request according to the page table entry attributes (Block 1140) and is then terminated.

Figure 12:
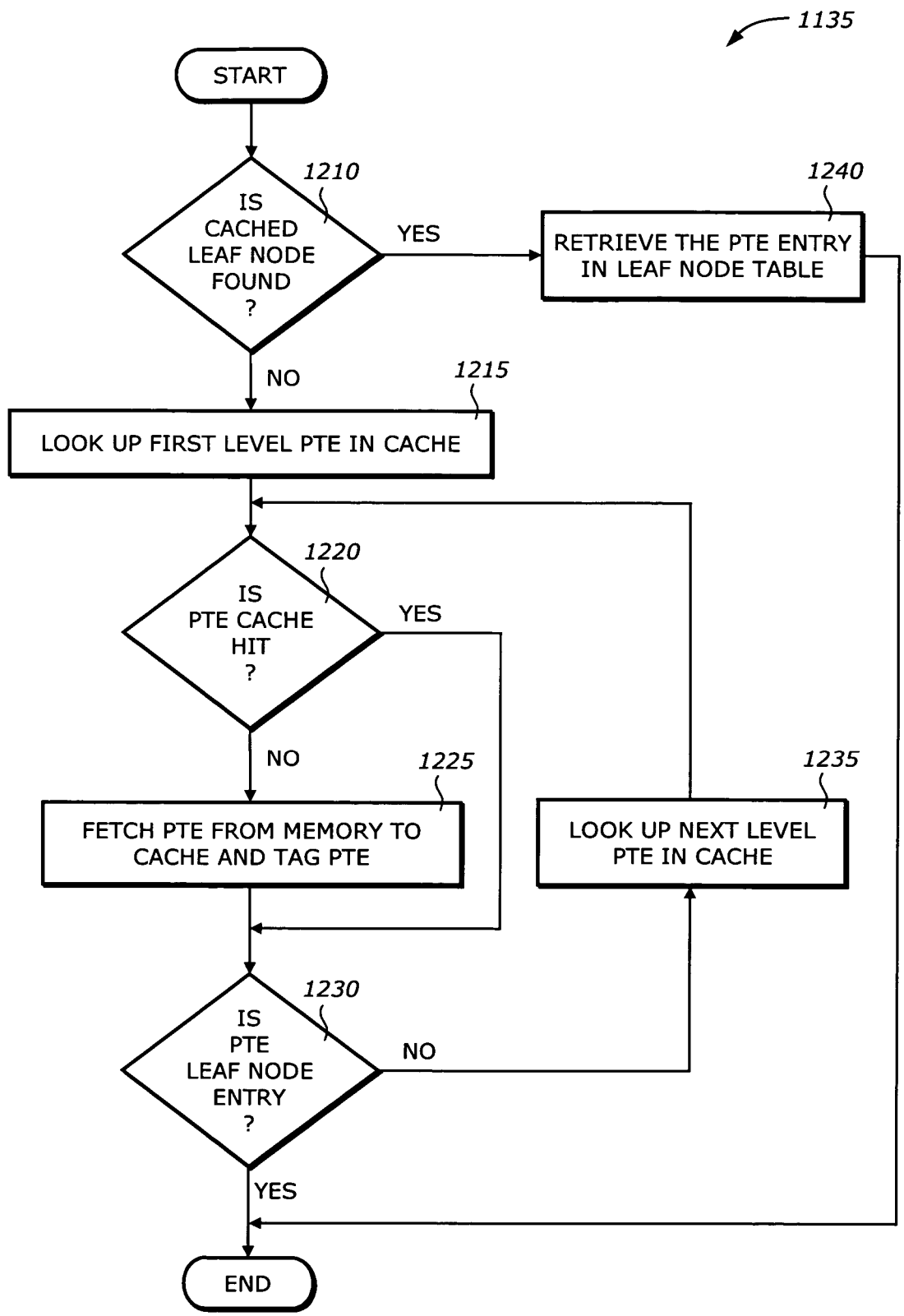
FIG. 12 is a flowchart illustrating a process to obtain a leaf page table entry according to one embodiment of the invention.

FIG. 12 is a flowchart illustrating the process 1135 to obtain a leaf page table entry according to one embodiment of the invention.

Upon START, the process 1135 determines if the cached leaf node has been found (Block 1210). This may be carried out by determining if the Super-page field in the page table entry is asserted. If the cached leaf node is found, the process retrieves the page table entry in the leaf node (Block 1240) and is then terminated. Otherwise, the process 1135 looks up the first level PTE in cache (Block 1215).

Then, the process 1135 if there is a cache hit in the PTE table (Block 1220). If so, the process 1135 proceeds to Block 1230. Otherwise, the process 1135 fetches the PTE from the memory to the cache and tag the PTE (Block 1225). Next, the process 1135 determines if the PTE is a leaf node entry (Block 1230). If not, the process 1135 looks up the next level PTE in the cache table (Block 1235) and returns to Block 1220. Otherwise, the process 1135 is terminated.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
   a cache structure to store cached entries used in address translation of a guest physical address to a host physical address, the guest physical address corresponding to a guest domain identified by a guest domain identifier in an input/output (I/O) transaction requested by an I/O device wherein the cache structure includes
   a root table cache to store root entries indexed by a guest requestor identifier of the I/O transaction, and
   a context table cache coupled to the root table to store cached context entries referenced by the root entries, the cached context entries being tagged with context domain identifiers identifying context domains corresponding to I/O requestor identifiers, the context domain identifiers including the guest domain identifier; and
   a register storing an invalidating domain identifier identifying an invalidating domain and an indicator indicating invalidating an entry in the cached entries having a tag.

2. The apparatus of claim 1 wherein the cache structure further comprises:
   a page table cache coupled to the context table cache to store cached page table entries referenced by the cached context entries, the cached page table entries providing base of a page of the host physical address and being tagged with the context domain identifiers.

3. The apparatus of claim 2 wherein the guest requestor identifier is used in a first cache access to the context table cache to look up a cached context entry in the context table cache.

4. The apparatus of claim 3 wherein the requestor identifier is used to index the root table cache to fetch the cached context entry from the context table cache if the first cache access is a miss.

5. The apparatus of claim 4 wherein a default context entry is used if the cached context entry is not valid.

6. The apparatus of claim 2 wherein the guest domain identifier is used to look up the page table cache.

7. The apparatus of claim 6 wherein the host physical address is formed if a cached page table entry corresponding to the guest domain identifier is found in a leaf node table.

8. The apparatus of claim 6 wherein the page table cache includes a plurality of cached page tables.

9. The apparatus of claim 8 wherein a second cache access to one of the cached page tables is used to obtain a cached page table entry corresponding to the guest domain identifier.

10. The apparatus of claim 9 wherein a memory page table entry is fetched from a memory to the one of the cached page tables if the second cache access is a miss.

11. The apparatus of claim 1 wherein the register is one of a context invalidate register and a page table invalidate register, the context invalidate register and the page table invalidate register being associated with the context table cache and the page table cache, respectively.

12. The apparatus of claim 1 wherein the indicator is one of a selective indicator and a global indicator, the selective indicator indicating invalidating the entry if the tag matches the invalidating domain identifier, the global indicator indicating invalidating the entry regardless of the tag.

13. A method comprising:
    storing cached entries in a cache structure, the cached entries being used in address translation of a guest physical address to a host physical address, the guest physical address corresponding to a guest domain identified by a guest domain identifier in an input/output (I/O) transaction requested by an I/O device wherein storing the cached entries in the cache structure includes
    storing root entries in a root table cache, the root entries being indexed by a guest requestor identifier of the I/O transaction; and
    storing cached context entries referenced by the root entries in a context table cache, the cached context entries being tagged with context domain identifiers identifying context domains corresponding to I/O requestor identifiers, the context domain identifiers including the guest domain identifier; and
    storing an invalidating domain identifier and an indicator in a register, the invalidating domain identifier identifying an invalidating domain, the indicator indicating invalidating an entry in the cached entries having a tag.

14. The method of claim 13 wherein storing the cached entries in the cache structure further comprises:
    storing cached page table entries referenced by the cached context entries in a page table cache, the cached page table entries providing base of a page of the host physical address and being tagged with the context domain identifiers.

15. The method of claim 14 further comprising:
    looking up a cached context entry in the context table cache using the guest requestor identifier in a first cache access to the context table cache.

16. The method of claim 15 further comprising:
    indexing the root table cache using the requestor identifier to fetch the cached context entry from the context table cache if the first cache access is a miss.

17. The method of claim 16 further comprising:
    using a default context entry if the cached context entry is not valid.

18. The method of claim 14 further comprising:
    looking up the page table cache using the guest domain identifier.

19. The method of claim 18 further comprising:
    forming the host physical address if a cached page table entry corresponding to the guest domain identifier is found in a leaf node table.

20. The method of claim 18 wherein the page table cache includes a plurality of cached page tables.

21. The method of claim 20 further comprising:
obtaining a cached page table entry corresponding to the guest domain identifier using a second cache access to one of the cached page tables.

22. The method of claim 21 further comprising:
fetching a memory page table entry from a memory to the one of the cached page tables if the second cache access is a miss.

23. The method of claim 13 wherein the register is one of a context invalidate register and a page table invalidate register, the context invalidate register and the page table invalidate register being associated with the context table cache and the page table cache, respectively.

24. The method of claim 13 wherein the indicator is one of a selective indicator and a global indicator, the selective indicator indicating invalidating the entry if the tag matches the invalidating domain identifier, the global indicator indicating invalidating the entry regardless of the tag.

25. A system comprising:
a memory;
an input/output (I/O) device generating a guest physical address in an I/O transaction to access the memory; and
a chipset coupled to the I/O device and the memory, the chipset including a circuit, the circuit comprising:
a cache structure to store cached entries used in address translation of a guest physical address to a host physical address, the guest physical address corresponding to a guest domain identified by a guest domain identifier in the input/output (I/O) transaction, wherein the cache structure includes a root table cache to store root entries indexed by a guest requestor identifier of the I/O transaction; and
a context table cache coupled to the root table to store cached context entries referenced by the root entries, the cached context entries being tagged with context domain identifiers identifying context domains corresponding to I/O requestor identifiers, the context domain identifiers including the guest domain identifier; and
a register storing an invalidating domain identifier identifying an invalidating domain and an indicator indicating invalidating an entry in the cached entries having a tag.

26. The system of claim 25 wherein the cache structure further comprises:
a page table cache coupled to the context table cache to store cached page table entries referenced by the cached context entries, the cached page table entries providing base of a page of the host physical address and being tagged with the context domain identifiers.

27. The system of claim 26 wherein the guest requestor identifier is used in a first cache access to the context table cache to look up a cached context entry in the context table cache.

28. The system of claim 27 wherein the requestor identifier is used to index the root table cache to fetch the cached context entry from the context table cache if the first cache access is a miss.

29. The system of claim 28 wherein a default context entry is used if the cached context entry is not valid.

30. The system of claim 26 wherein the guest domain identifier is used to look up the page table cache.

31. The system of claim 30 wherein the host physical address is formed if a cached page table entry corresponding to the guest domain identifier is found in a leaf node table.

32. The system of claim 30 wherein the page table cache includes a plurality of cached page tables.

33. The system of claim 32 wherein a second cache access to one of the cached page tables is used to obtain a cached page table entry corresponding to the guest domain identifier.

34. The system of claim 33 wherein a memory page table entry is fetched from a memory to the one of the cached page tables if the second cache access is a miss.

35. The system of claim 25 wherein the register is one of a context invalidate register and a page table invalidate register, the context invalidate register and the page table invalidate register being associated with the context table cache and the page table cache, respectively.

36. The system of claim 25 wherein the indicator is one of a selective indicator and a global indicator, the selective indicator indicating invalidating the entry if the tag matches the invalidating domain identifier, the global indicator indicating invalidating the entry regardless of the tag.

37. An article of manufacture comprising:
a machine-accessible medium including data that, when accessed by a machine, causes the machine to perform operations comprising:
storing cached entries in a cache structure, the cached entries being used in address translation of a guest physical address to a host physical address, the guest physical address corresponding to a guest domain identified by a guest domain identifier in an input/output (I/O) transaction requested by an I/O device; and
storing an invalidating domain identifier and an indicator in a register, the invalidating domain identifier identifying an invalidating domain, the indicator indicating invalidating an entry in the cached entries having a tag
wherein the data causing the machine to perform storing the cached entries in the cache structure comprises data that cause the machine to perform operations comprising:
storing root entries in a root table cache, the root entries being indexed by a guest requestor identifier of the I/O transaction; and
storing cached context entries referenced by the root entries in a context table cache, the cached context entries being tagged with context domain identifiers identifying context domains corresponding to I/O requestor identifiers, the context domain identifiers including the guest domain identifier.

38. The article of manufacture of claim 37 wherein the data causing the machine to perform storing the cached entries in the cache structure further comprises data that cause the machine to perform operations comprising:
storing cached page table entries referenced by the cached context entries in a page table cache, the cached page table entries providing base of a page of the host physical address and being tagged with the context domain identifiers.

39. The article of manufacture of claim 38 wherein the data further comprises data that cause the machine to perform operations comprising:
looking up a cached context entry in the context table cache using the guest requestor identifier in a first cache access to the context table cache.

40. The article of manufacture of claim 39 wherein the data further comprises data that cause the machine to perform operations comprising:
indexing the root table cache using the requestor identifier to fetch the cached context entry from the context table cache if the first cache access is a miss.

41. The article of manufacture of claim 40 wherein the data further comprises data that cause the machine to perform operations comprising:
  using a default context entry if the cached context entry is not valid.

42. The article of manufacture of claim 38 wherein the data further comprises data that cause the machine to perform operations comprising:
  looking up the page table cache using the guest domain identifier.

43. The article of manufacture of claim 42 wherein the data farther comprises data that cause the machine to perform operations comprising:
  forming the host physical address if a cached page table entry corresponding to the guest domain identifier is found in a leaf node table.

44. The article of manufacture of claim 42 wherein the page table cache includes a plurality of cached page tables.

45. The article of manufacture of claim 44 wherein the data farther comprises data that cause the machine to perform operations comprising:
  obtaining a cached page table entry corresponding to the guest domain identifier using a second cache access to one of the cached page tables.

46. The article of manufacture of claim 45 wherein the data farther comprises data that cause the machine to perform operations comprising:
  fetching a memory page table entry from a memory to the one of the cached page tables if the second cache access is a miss.

47. The article of manufacture of claim 37 wherein the register is one of a context invalidate register and a page table invalidate register, the context invalidate register and the page table invalidate register being associated with the context table cache and the page table cache, respectively.

48. The article of manufacture of claim 37 wherein the indicator is one of a selective indicator and a global indicator, the selective indicator indicating invalidating the entry if the tag matches the invalidating domain identifier, the global indicator indicating invalidating the entry regardless of the tag.

* * * * *